(12) United States Patent
Harriman et al.

(10) Patent No.: US 10,191,877 B2
(45) Date of Patent: Jan. 29, 2019

(54) ARCHITECTURE FOR SOFTWARE DEFINED INTERCONNECT SWITCH

(71) Applicant: Intel Corporation, Santa Clara, CA (US)

(72) Inventors: David J. Harriman, Portland, OR (US); Manjari Kulkarni, Hillsboro, OR (US); Akshay G. Pethe, Hillsboro, OR (US); Sean O. Stalley, Hillsboro, OR (US); Mahesh Wagh, Portland, OR (US); Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 14/978,179

(22) Filed: Dec. 22, 2015

(65) Prior Publication Data

US 2017/0177528 A1 Jun. 22, 2017

(51) Int. Cl.
*G06F 13/40* (2006.01)
*G06F 13/36* (2006.01)
*G06F 13/42* (2006.01)

(52) U.S. Cl.
CPC .......... *G06F 13/4022* (2013.01); *G06F 13/36* (2013.01); *G06F 13/4282* (2013.01)

(58) Field of Classification Search
CPC .................................................. G06F 13/4022
See application file for complete search history.

(56) References Cited

U.S. PATENT DOCUMENTS

| 7,236,987 | B1 * | 6/2007 | Faulkner | G06F 17/30067 |
| 8,621,178 | B1 * | 12/2013 | Lazar | G06F 12/0223 |
| | | | | 711/117 |
| 2009/0154469 | A1 | 6/2009 | Winter | |
| 2011/0103259 | A1 | 5/2011 | Aybay et al. | |
| 2013/0024595 | A1 * | 1/2013 | Subramaniyan | G06F 13/28 |
| | | | | 710/308 |
| 2013/0151750 | A1 * | 6/2013 | Kanigicherla | G06F 13/4022 |
| | | | | 710/313 |
| 2013/0179617 | A1 * | 7/2013 | Myrah | G06F 3/0605 |
| | | | | 710/300 |
| 2015/0071292 | A1 * | 3/2015 | Tripathi | H04L 45/66 |
| | | | | 370/392 |
| 2015/0161068 | A1 * | 6/2015 | Jones | G06F 12/00 |
| | | | | 710/311 |

(Continued)

FOREIGN PATENT DOCUMENTS

WO 2017112198 A1 6/2017

OTHER PUBLICATIONS

International Search Report and Written Opinion in International Patent Application No. PCT/US2016/062968 dated Mar. 9, 2017.

*Primary Examiner* — Farley Abad
(74) *Attorney, Agent, or Firm* — Alliance IP, LLC

(57) ABSTRACT

An interconnect switch is provided including switching logic executable to facilitate a Peripheral Component Interconnect Express (PCIe)-based interconnect, and further including a control host embedded in the switch to provide one or more enhanced routing capabilities. The control host includes a processor device, memory, and software executable by the processor device to process traffic received at one or more ports of the switch to redirect at least a portion of the traffic to provide the one or more enhanced routing capabilities.

24 Claims, 16 Drawing Sheets

(56) References Cited

U.S. PATENT DOCUMENTS

2015/0261709 A1    9/2015  Billi
2016/0036643 A1*  2/2016  Nair .................... H04L 12/4641
                                                                       370/255

* cited by examiner

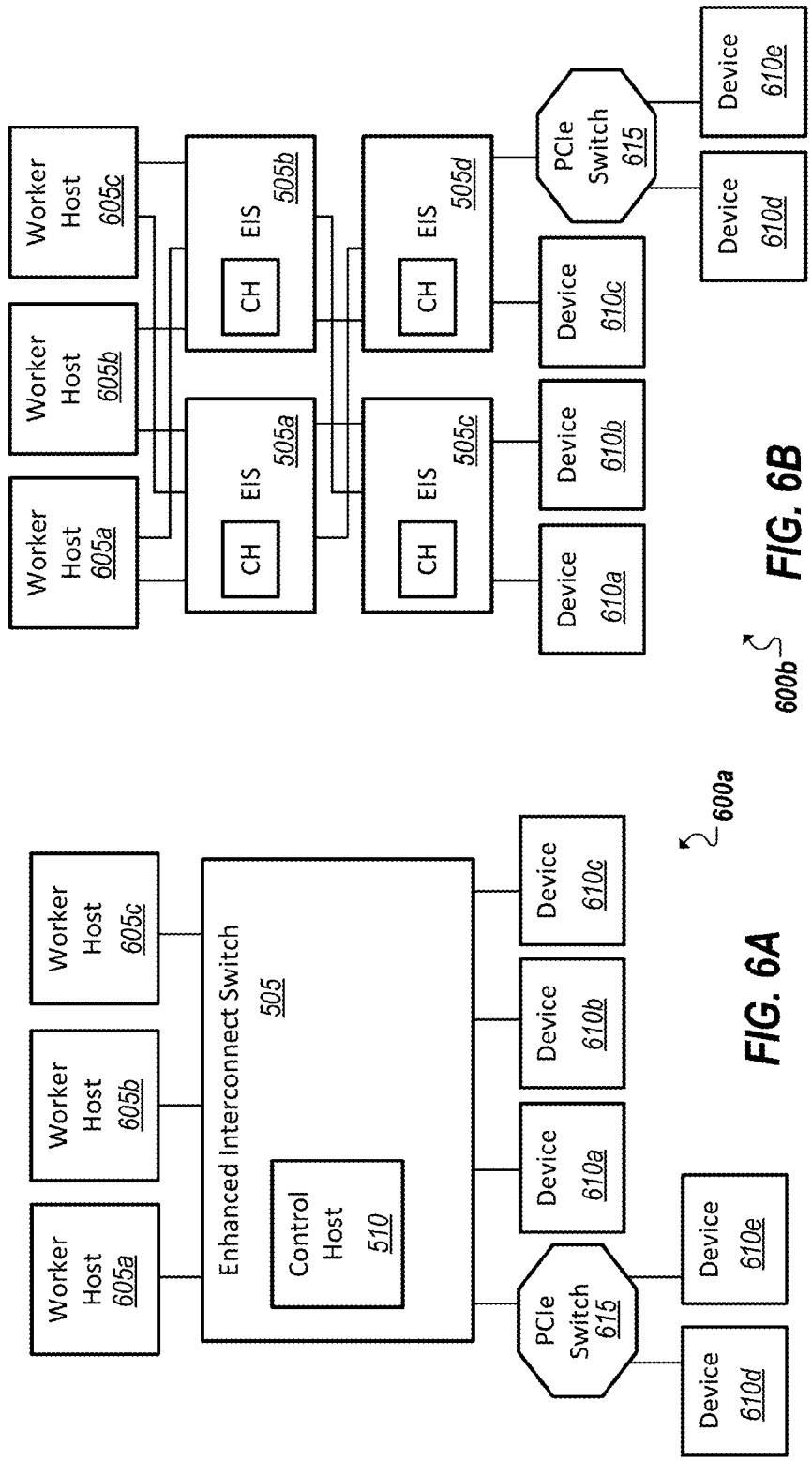

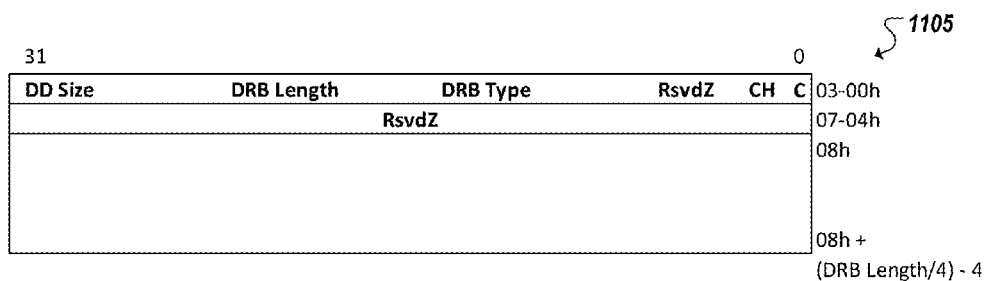

| 31 | | | | | | 0 | |
|---|---|---|---|---|---|---|---|
| DD Size | DRB Length | DRB Type | RsvdZ | CH | C | | 03-00h |
| RsvdZ | | | | | | | 07-04h |
| | | | | | | | 08h |
| | | | | | | | 08h + (DRB Length/4) - 4 |

OFFSET 00h

| Bits | Description |
|---|---|
| 0 | Enqueue Bit<br><br>This bit, if set, marks the Enqueue Pointer of the DRB ring. The producer is expected to clear this bit when the DRB is read to be consumed. The consumer of this ring does not consume this DRB unless this bit is cleared. To prevent ring overrun, the producer of this ring must always have at least one DRB with the Enqueue bit set. |
| 9:1 | RsvdZ |
| 15:10 | DRB Type<br><br>For normal DRB this field should be 6'b000001 |
| 26:16 | DRB Length<br><br>This field gives the length of the data pointed to by this DRB in bytes. This field has the exact same meaning as the Length field in a PCIe transaction header.<br><br>This field is also used to indicate number of valid bytes if IDT is set to 1. If IDT is set to 1, then this field must have a value between 0 and 8. |
| 31:27 | RsvdZ |

OFFSET 04h

| Bits | Description |
|---|---|
| 31:0 | RsvdZ |

OFFSET 08 - {(08h + DRB Length/4)-4}h

| Bits | Description |
|---|---|
| 32:0 | Data<br><br>This field contains the data. |

*FIG. 12*

ARCHITECTURE FOR SOFTWARE DEFINED INTERCONNECT SWITCH

FIELD

This disclosure pertains to computing system, and in particular (but not exclusively) to interconnect switch fabrics.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIGS. 6A-6B illustrate example topologies utilizing one or more enhanced interconnect switches.

FIG. 12 illustrates an example data ring buffer (DRB) structure of an example DTR.

DETAILED DESCRIPTION

Figure 1:
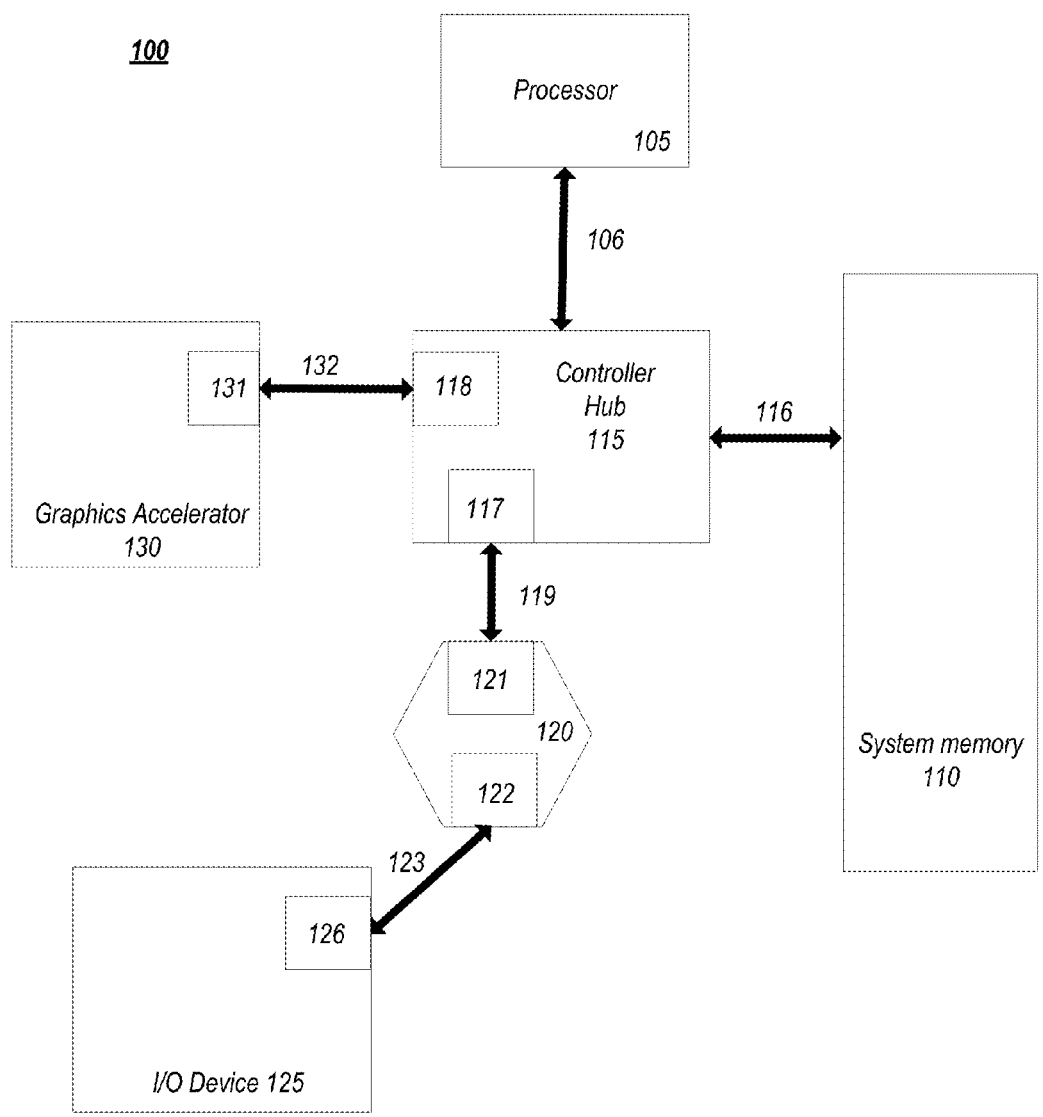
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
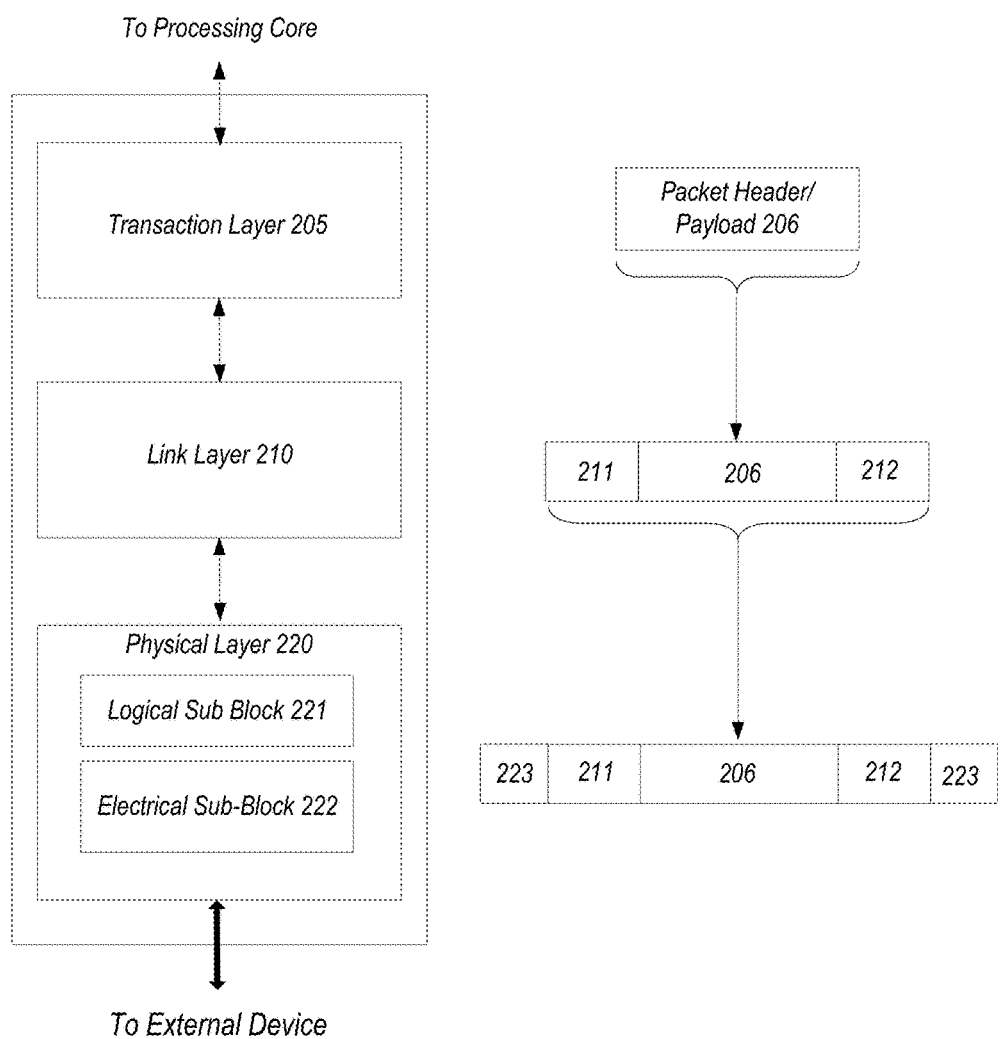
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message transactions are defined to support in-band communication between PCIe agents.

Therefore, in one embodiment, transaction layer 205 assembles packet header/payload 156. Format for current packet headers/payloads may be found in the PCIe specification at the PCIe specification website.

Figure 3:
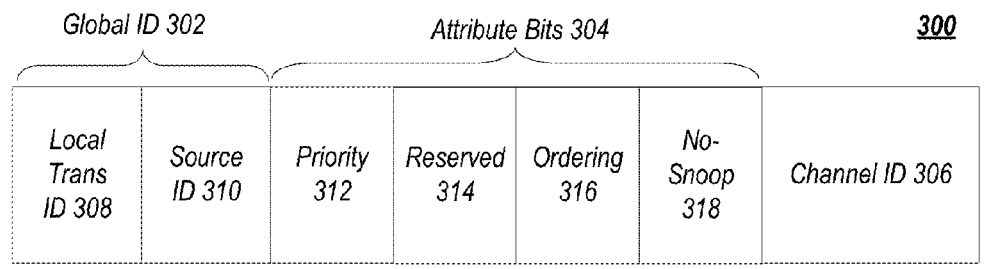
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
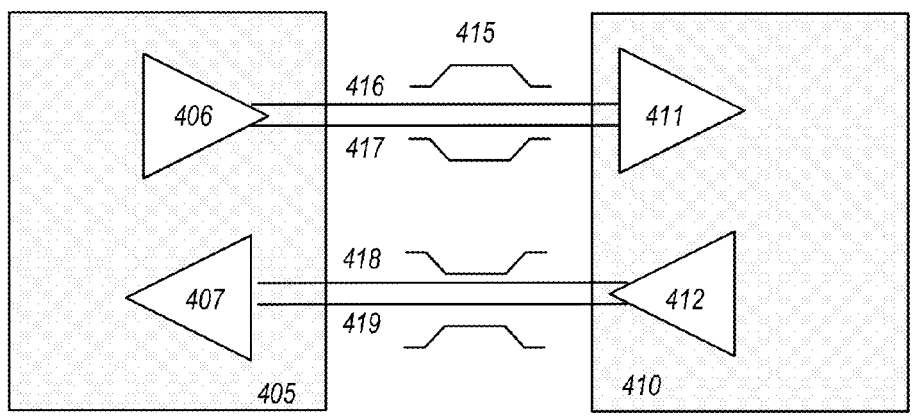
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by ×N, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Since the initial development of PCI Express (PCIe) it was recognized that the limited topologies supported by PCI could be extended into interconnect fabrics with a much broader range of allowable topologies. However, previous attempts to leverage the desirable features of PCIe and extend the protocol to implement wider area networked systems, have largely failed, either in implementation or adoption. Indeed, prior solutions attempted to do too much, in that they made too many changes to the native PCIe architecture and thus undermined some of the key features of PCIe. In an implementation described herein, an enhanced interconnect switch (or EIS) for PCIe (or a similar interconnect protocol) can be provided that builds on the underlying mechanisms defined by PCIe (e.g., PCIe Switches, Hot Plug, IO Virtualization, etc.) to provide an infrastructure for flexible resource management and inter-processor communication and thereby enable a variety of extended uses case for PCIe.

For instance, PCIe topologies implemented using an EIS (or network of EISes) may not encapsulate or tunnel PCIe TLPs, but instead perform very minimal processing on the TLPs themselves to remap addresses (memory, IO and Bus/Device/Function, as appropriate for the TLP type). Such memory/memory routing may be preferable by implementing less management overhead to configure the fabric, and building upon existing input-output memory management unit (IOMMU) implementations of PCIe such as Virtualization Technology for Directed I/O (VT-d). Topologies can also be implemented through one or more EISes, which do not define new addressing spaces, such as a fabric-specific routing space. The potential benefits of defining such a space are outweighed by the inefficiencies of having to manage such new address spaces and maintain its correct relationship(s) with the existing PCIe address spaces. Further, flow control or congestion management can be foregone, given the costs associated with implementing and maintaining them. In some implementations, an EIS-based topology may also not perform (or even allow, in some cases) Segmentation and Reassembly (SAR) of PCIe TLPs, which are instead routed in their "native" form, ensuring that hardware/software mechanisms which may depend on specific platform behaviors continue to work. Further, EIS-based topologies can utilize native PCIe Link types, rather than defining new Link types, allowing a robust extended topology without (re)defining Link establishment, management, etc.

An EIS-based system topology can enable implementation flexibility to provide anywhere from a very limited to a feature-rich set of capabilities. Accordingly, implementations of an EIS can enable an optimized cost/power/performance/feature balance. Indeed, rather than replace networking topologies, such as InfiniBand, Ethernet, or other similar technologies (and the costly performance penalties introduced through such network-first technologies), similar system solutions can be developed based on PCIe, while improving performance by avoiding NIC or Host Adapter-based traffic routing and tolerating relatively lower levels of isolation, fabric management, and other features enabled through PCIe.

Figure 5:
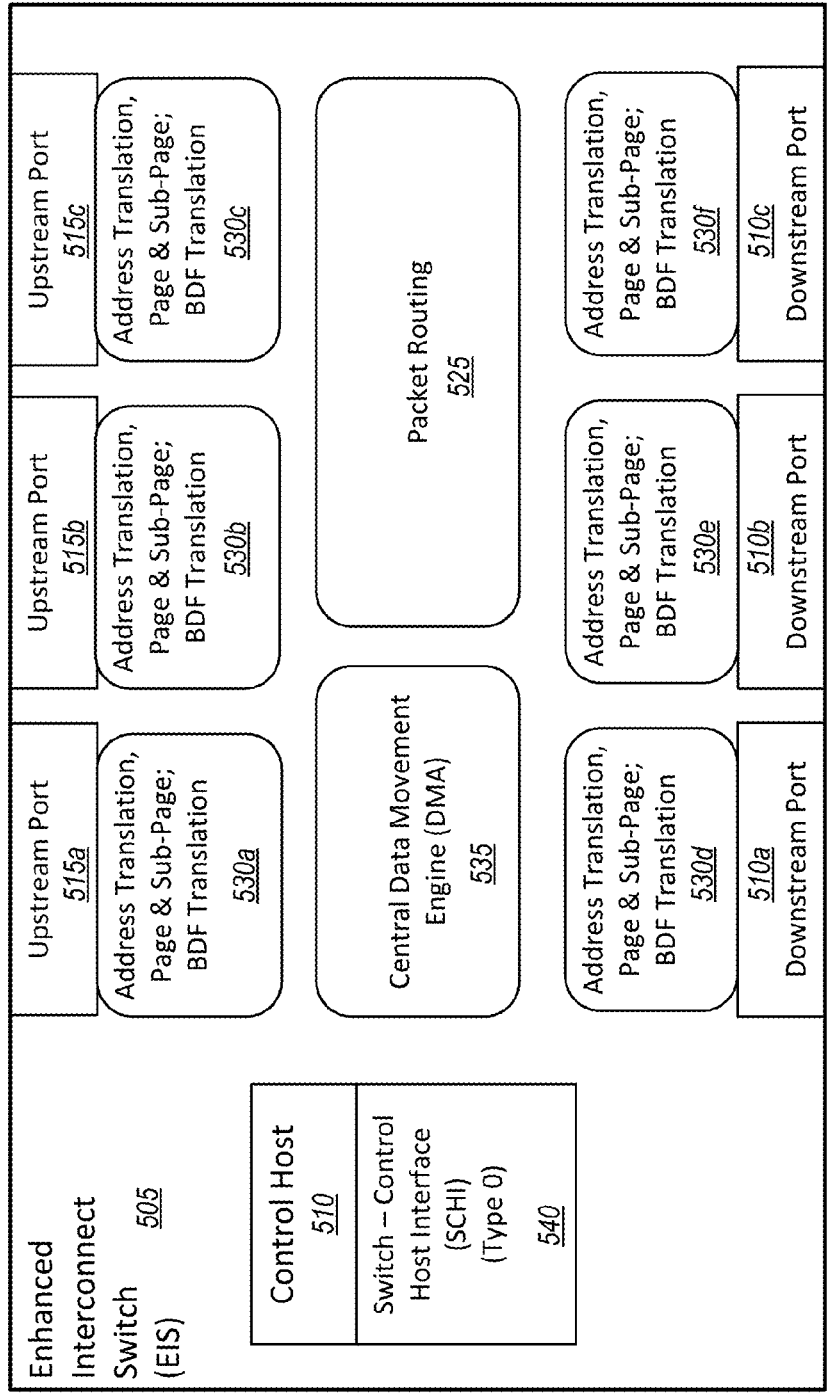
FIG. 5 illustrates an example embodiment of an enhanced interconnect switch (EIS).

An EIS-based architecture can define a set of mechanisms built upon PCIe industry specified capabilities to enable a variety of capabilities not possible with baseline PCIe. Indeed, a "fabric" of hosts and devices can be interconnected through one or more EISes. Turning to FIG. 5, a simplified block diagram 500 is shown illustrating a representation of an enhanced interconnect switch (EIS) 505. An EIS can be implemented as an enhanced PCIe switch, including a dedicated control host processor system (or control host) 510 for realizing, at the switch, or fabric, level enhanced logic to enable additional capabilities beyond what are realizable using native PCIe and native PCIe switches. The EIS can further include one or more upstream ports (e.g., 515a-c), one or more downstream ports (e.g., 520a-c) and PCIe-based packet routing logic 525. In some implementations, the EIS can host virtual devices allowing for some use cases where zero downstream ports. In some implementations, each port (e.g., 515a-c, 520a-c) can be additionally provisioned with an I/O logic block (e.g., 530a-f) (e.g., implemented at least in part in hardware circuitry) providing such enhancements as address translation and configuration bus/device/function (BDF) translation and page and subpage management, among other features. Further, in some implementations, an EIS can optionally include a central data movement engine (DMA) 535 to support data movement (e.g., for use in topologies supporting host-to-host communications) and further support improved performance and/or efficiency of the system.

In addition to packet routing capabilities, each EIS 505 can be provided with hardware to optimize certain operations, such as address translation, and a dedicated computing capability, through control host 510, which may be implemented as a dedicated microprocessor or conventional standalone server integrated within the architecture in the form of a system on chip (SoC). The control host 510 can be integrated or embedded in the sense that it is not available for general purpose use (e.g., by other system resources, such as other hosts or devices), but has its own memory and runs, directly on the EIS 505, a dedicated software stack to ensure robustness, performance, and security.

As in other PCIe systems, a distinction can be made between "hosts" (CPUs or Root Complexes) and devices. Further, traditional PCIe hosts can sometimes also referred to in this disclosure as "worker hosts" to distinguish them from the EIS-dedicated control host 510. The operational configuration of the EIS 505 can be managed by its control host 510. In cases employing multiple EISes (each with its own control host) to implement a fabric, a fabric management interface can be provided to manage the combined operational configuration of the multiple EISes, among other examples. In the example of FIG. 5, the control host 510 can be provided with a switch/control host interface (SCHI) 540 to facilitate the interface between the control host 510 and the remaining components of the EIS. The SCHI can be a Type 0 device that is exposed only to the control host 510. As an implementation option, the upstream port can be considered a logical entity, which may also be associated with a physical port in the case where the control host is discrete, or it may simply be a logical construct (to provide a consistent software view) in the case where the control host is integrated on the same silicon package as the remaining EIS, among other example implementations.

Turning to FIG. 6A, a simplified block diagram 600a is shown illustrating the connection of multiple hosts 605a-c (at upstream ports) and multiple devices 610a-e (at downstream ports) of an example EIS 505. In lieu of direct connections to the downstream (or upstream) ports of the EIS, some devices (e.g., 610d-e) may be connected to the EIS by way of another additional PCIe switch 615 (such as a traditional non-EIS PCIe switch), which is connected directly to a port of the EIS 505. Further, as shown in the simplified block diagram 600b of FIG. 6B, multiple EISes (e.g., 505a-d) may be networked together (each with its own control host (CH)) to serve as the interconnect fabric of a system including hosts 605a-c and devices 610a-e). In some implementations, an EIS can be provided with a management capability to facilitate multi-tier EIS networks, for instance, by coordinating the configurations of multiple EIS's consistently, among other tasks.

In some cases, devices (e.g., 610a-e) can each fall into one of three device classes: storage devices, networking interface (e.g., network interface controllers (NIC)), and computing elements (e.g., graphics processing units, co-processors, etc.). Storage devices can be an type of storage device including non-volatile memory (NVM) and NVM Express (NVMe) host controllers, direct mapped storage devices, and other computer memory storage devices (including a memory controller and corresponding memory). Network interface devices can provide network connections to other networks and computing components. NIC devices, for instance, can connect an EIS-enabled PCIe network (e.g., such as shown in FIGS. 6A-6B) to another network utilizing a different communications protocol or technology, such as an Ethernet, Infiniband, or fiber channel network, among other examples. Computing element devices can be computing processors of varying capabilities and processing power, including devices such as as Xeon PHI processors, field-programmable gate array (FPGA) devices, graphics processor (GP) devices, and so on. Indeed, computing elements, though treated as devices, can in some implementations be functionally similar to the hosts (e.g., 605a-c). An EIS-built fabric can flexibly support potentially any combination of hosts and devices, as well as complex topologies utilizing such combinations.

The control host 510 can execute code (stored locally in software or firmware of the control host) to provide enhanced switching services for topologies including an EIS 505. Examples of such services are described, for instance, below in the examples of FIGS. 7A-8B, and may include dynamic assignment of devices to hosts, virtualization of devices (which are transparent to hosts), among other features.

In some cases, data received at an EIS 505 may be provided to the control host 510 for processing in accordance with services provided by logic of the control host. In other cases, packets can be received that involve traditional or lower-end routing, allowing the control host to forego processing of these packets. For instance, TLPs received at EIS ports (e.g., 515a-c, 520a-c) can be filtered to determine if they can be passed through the EIS switching logic (i.e., outside the EIS), such as through address/BDF translation logic (e.g., 530a-f), or if they should be first handled by the control host 510. Such TLP filtering can be controlled per-port, with the granularity of one example shown in Table 1. For instance, depending on the TLP type, and whether it is received at an upstream or downstream port, the packet can be either passed through ("PT") through without handling by the control host or passed to the control host 510 for processing.

TABLE 1

| TLP Filtering | | |
|---|---|---|
| TLP | Upstream Ports | Downstream Ports |
| MRd, MRdLk, MWr, IORd, IOWr | Pass-Through (PT)/Send to Control Host(CH) | PT/CH |
| CfgRd0, CfgWr0, CfgRd1, CfgWr1, Msg, MsgD | CH | CH |
| Cpl, CplD | PT/CH | PT/CH |
| CplLk, CplDLk | CH | PT/CH |
| FetchAdd, Swap, CAS | PT/CH | PT/CH |
| LPrfx, Eprfx | <based on TLP type> | <based on TLP type> |

As noted in Table, in one example, in all modes of operation, PCIe TLPs including Configuration Requests (e.g., CfgRd0, CfgWr0, etc.) and Messages (e.g., MRd, MWr, etc.) are filtered to be directed to the control host 510, which generates the appropriate responses based on the operational configuration of the EIS. For instance, for Configuration Requests to EIS Registers, Read-Only Register contents are kept up-to-date in Control Host Memory, and the Interrupt Service Routine (ISR) (e.g., implementing actions directly triggered via an interrupt (as opposed to subsequent processing queued up for later execution, e.g. through a Delayed Procedure Call)) immediately generates and enqueues for transmission the Completion (e.g., with a targeted response latency of 2 to 4 μs). RW/RW1C Register writes may result in a work queue entry including the received TLP and meta-data (e.g., with the control host providing best-effort service with a target response latency of less than 50 μs). For configuration requests passing through the EIS, the control host can apply its own Requester ID, translate the target BDF from the corresponding worker host's BDF space into the control host's BDF space, and then enqueues the Request for transmission out the appropriate Port. The reverse translations may be applied to the Completion. In some implementations, all Messages received at the EIS 505 are to be routed through the control host 510. For Messages which do not affect the EIS (e.g., involving "translation only" handling by the control host), the Control Host applies its own Requester ID, translates the target BDF from the specific worker host's BDF space into the control host's BDF space, then enqueues the Request for transmission out the appropriate Port. For Messages which affect the EIS, the control host can invoke the appropriate handling mechanisms as described in Table 2 and as described in more detail below.

TABLE 2

EIS Handling Mechanisms

| Message Code | Route | Type | Description | EIS Handling |
|---|---|---|---|---|
| 0000 0000 | 011 | Msg | Unlock | Translation only |
| 0000 0001 | 010 | MsgD | Invalidate Request Message | ATS (Optional), |
| 0000 0010 | 010 | Msg | Invalidate Completion | handled through |
| 0000 0100 | 000 | Msg | Message Page Request | Memory Virtualization |
| 0000 0101 | 010 | Msg | Message PRG Response Message | |
| 0001 0000 | 100 | Msg | Latency Tolerance | Power Management |
| 0001 0010 | 100 | Msg | Reporting Optimized Buffer | |
| 0001 1000 | 000 | Msg | Flush/Fill PM_PME | |
| 0001 1001 | 011 | Msg | PME_Turn_Off | |
| 0001 1011 | 101 | Msg | PME_TO_Ack | |
| 0001 0100 | 100 | Msg | PM_Active_State_Nak | |
| 0010 00xx | 100 | Msg | Assert_INT[ABCD] | Interrupt |
| 0010 01xx | 100 | Msg | Deassert_INT[ABCD] | |
| 0011 0000 | 000 | Msg | ERR_COR | Error Handling |
| 0011 0001 | 000 | Msg | ERR_NONFATAL | |
| 0011 0011 | 000 | Msg | ERR_FATAL | |
| 0101 0000 | 100 | MsgD | Set_Slot_Power_Limit DRS | Port Management |
| 0111 1111 | 100 | Msg | [PCISIG VDM Type 1] | |
| 0101 0010 | 100 | Msg | PTM Request PTM | PTM (Optional) |
| 0101 0011 | 100 | Msg/MsgD | Response/PTM ResponseD | |
| 0111 1111 | 010 | MsgD | LN Message-Directed | Fabric Caching |
| 0111 1111 | 011 | MsgD | [PCISIG VDM Type 1] LN Message-Broadcast [PCISIG VDM Type 1] | (Optional) |
| 0111 1111 | 000 | Msg | FRS Message [PCISIG VDM Type1] | Virtualization (FRS support Optional) |
| 0111 1110 | 000, 010, 011, or 100 | Msg/MsgD | Vendor_Defined Type 0 [other than PCISIG-defined VDMs] | Exception Handling |
| 0111 1111 | 000, 010, 011, or 100 | Msg/MsgD | Vendor_Defined Type 1 [other than PCISIG-defined VDMs] | Exception Handling |
| All other | xxx | x | x | Exception Handling |

By providing a relatively high performance dedicated control host, an EIS fabric is better able to support flexible virtualization models than traditional approaches. For instance, an EIS, through the control host logic, can support such use cases as the virtualization of non-single root I/O virtualization (SR-IOV) devices across multiple hosts, including using virtualization to effectively morph one type of device into another (e.g. one type of storage controller into another type) as viewed by of one or more of the hosts. The provision of a control host (e.g., 610) as a high performance element embedded in a PCIe switch can thereby allow virtualization to be offloaded more effectively and more broadly in software.

For potentially any configuration, an EIS control host can define the respective memory and BDF spaces in which the devices exist (i.e., which the devices use for addressing). For example, the control host can exposes devices using the defined PCIe Switch mechanisms for hot plug, power management, error reporting, virtualization, access control, etc. The control host can further determine which indications from devices (e.g., 610a-e) are passed through to an associated worker host (e.g., 605a-c) and how they are passed through, either unmodified or with modification by the control host. Additionally, a control host, in some cases can generate, independent of device state or action, notifications to a worker host, for example, indicating a Surprise Disconnect when a device has to be abruptly removed from a worker host, among other alerts or events.

As noted, the PCI Memory and Segment/BDF space in which all EIS downstream ports operate can be defined and controlled by the corresponding control host. Hardware and software mechanisms in the EIS may be used to provide a 1-to-1 mapping between the control host's view of an address space and that of a given worker host (e.g., 605a-c). Indeed, these mappings may be strictly 1-to-1, such that there is no aliasing or loss of information (e.g., such as in error reporting, etc.). Generally, the EIS can redirect packets received at the EIS through the control host. This can involve identifying from a destination identified in an packet (e.g., TLP) a respective assigned or virtualized device or host managed and controlled by the control host processor (and software), and causing the packet to be handled (and routed) accordingly. From the destination, the EIS can determine whether the control host is to provide services in connection with the routing of the TLP. In some cases, the advanced functionality and logic of the control host will not be utilized for a particular TLP, while, for other TLPs (and corresponding destination) use of the control host is critical. Indeed, a control host can reformat or generate additional TLPs to forward to one or more ports (including virtual ports connecting to virtual devices instantiated by the control host) of the EIS in response to receiving a particular TLP, among other examples. The control host can enable a variety of use cases and transaction through the enhanced capabilities supported by the control host logic.

Figure 7A:
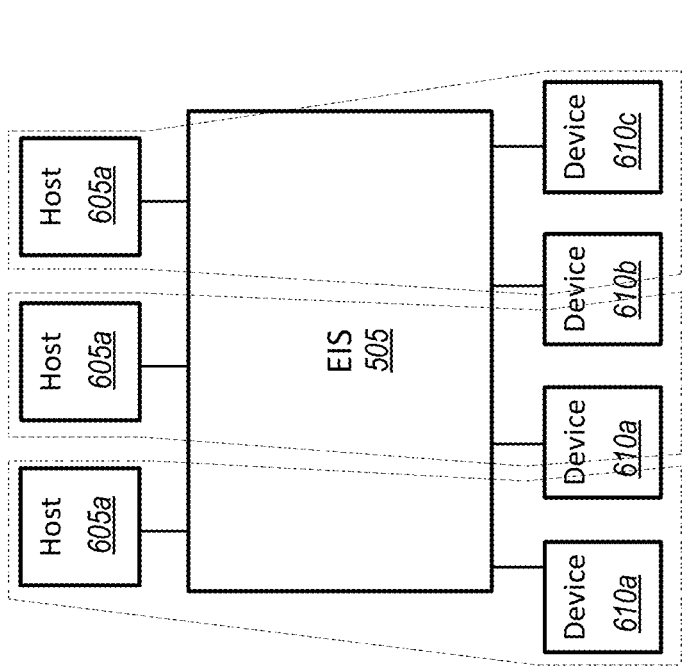
FIGS. 7A-7C illustrate capabilities enabled by an example enhanced interconnect switch.
Figure 7B:
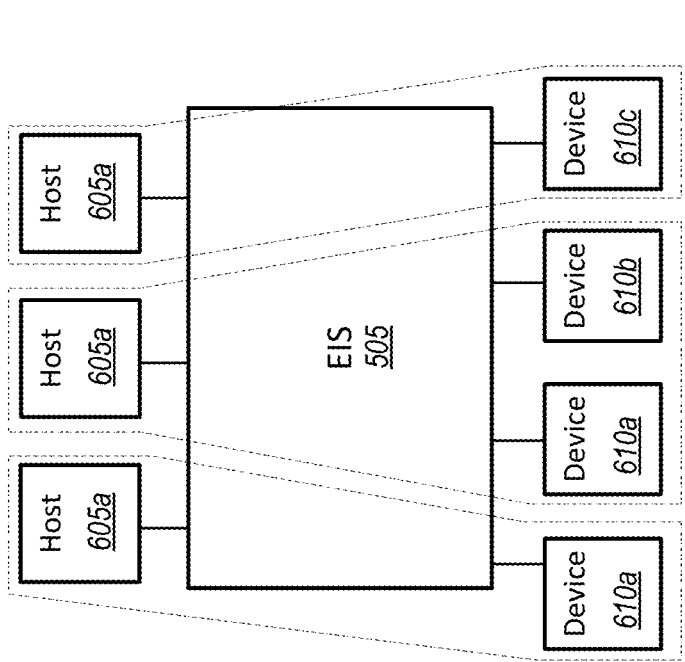
Figure 7C:
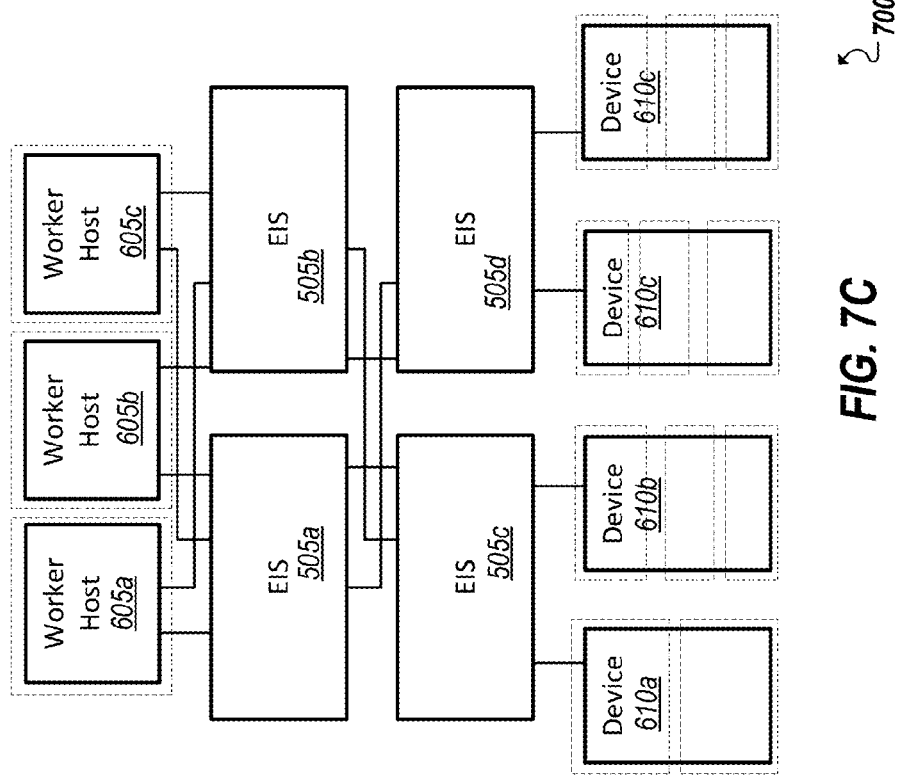

Turning to FIGS. 7A-7C, simplified block diagrams 700a-c are shown illustrating example capabilities enabled by an EIS-based fabric. For instance, as represented in the example of FIG. 7A, a Simple Assignment capability can be defined and supported utilizing logic of the EIS. The Simple Assignment capability of an EIS 505 can extend the definition of a PCIe Switch to support the allocation of device hardware to individual hosts. For instance, each device (610a-d) connected to a downstream port of the EIS can be assigned to a single respective host (605a-c) connected to an upstream port of the EIS. Accordingly, when a host is assigned a device through Simple Assignment, the view of the host (605a) is what appears to be a conventional PCIe Switch connecting to this host (605a) to its assigned devices (e.g., 610a). The host 605a may be unaware that other hosts (e.g., 605b-c) or other devices (e.g., 610b-d) are also connected to the same EIS 505, as individual hosts and devices are fully isolated from each other through the fabric of the EIS 505. Further, through Simple Assignment, device assignments can be modified (e.g., reassigned or cancelled) at runtime through emulated hot remove/add provided through Simple Assignment. For instance, while in the example of FIG. 7A, devices 610b-c may be originally assigned to host 610b (e.g., as storage devices of host 610b), it can be determined that host 610a has a greater need for storage capacity and one or both of devices 610b-c can be re-assigned, on the fly, from host 610b to 610a (i.e., without changing any physical connections at the EIS), among other examples.

Turning to FIG. 7B, a second, more sophisticated capability, Virtualized Assignment (VA) can be provided through the control host logic of the EIS 505. Virtualized Assignment can extend existing PCIe SR-IOV to support fractional assignment of devices, at the level of Virtual Functions, to specific hosts (e.g., 605a-c). For instance, as shown in the example of FIG. 7B, a portion of device 610b is assigned to each of hosts 605a and 605b, and a portion of device 610c is assigned to each of hosts 605b and 605c (while devices 610a and 610d are each assigned to a single host (e.g., 605a and 605d respectively)). Such fractional Virtualized Assignments can also be modified at run time to allow for still more flexibility in allocation of device resources (e.g., allowing resources to be more incrementally scaled, assigned, rebalanced, etc.).

Turning to FIG. 7C, EIS can further enable a Multi-Tier Virtualized Assignment capability, which builds on Virtualized Assignment through the use of multiple layers of EISes (e.g., 505a-d). The EISes can be interconnected to provide full path redundancy thereby supporting the ability, through control host software, to support fully redundant paths between hosts and devices, providing systems amenable to deployment of remote access services (RAS) and other performance benefits. For instance, control host logic can provide such functionality as defining primary and fail-over paths, defining routing rules to allow multiple paths to be used at the same time for improved performance (e.g., distinguishing based on Requester ID), among other examples. Further, as with Virtualized Assignment, Multi-Tier Virtualized Assignment (or MTVA) can support assignment of fractional portions of the device resources, adding multi-path connectivity. In this example, for instance, a fractional portion of device 610a can be assigned to each of hosts 605a and 605c, while a fractional portion of the resources of devices 610b-c are assigned to each of hosts 605a-c, among other example configurations.

Figure 8A:
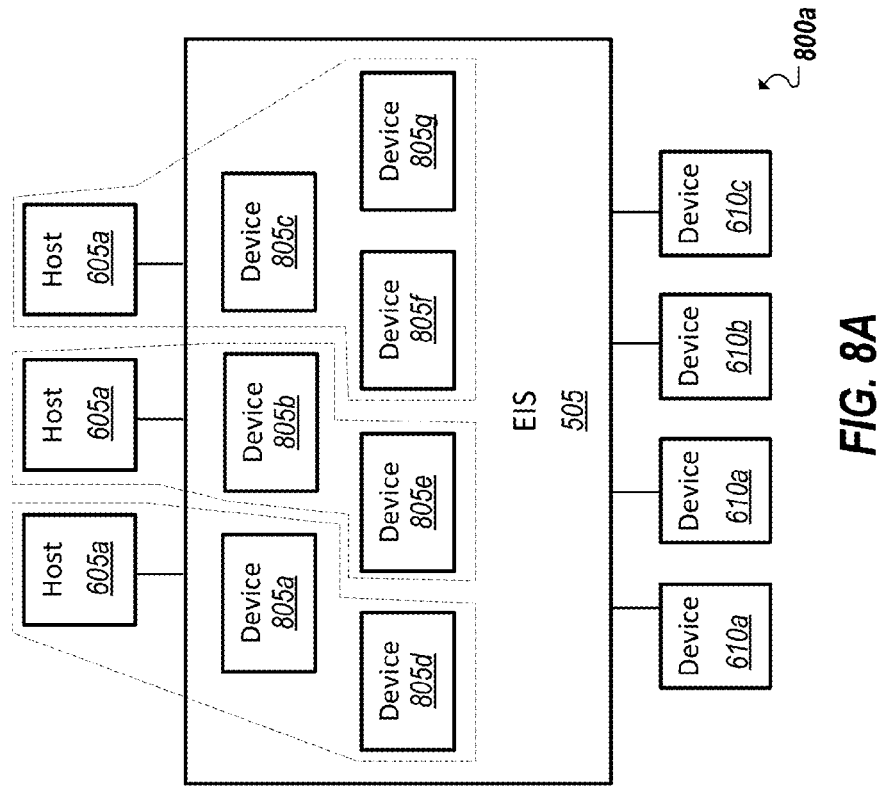
FIGS. 8A-8B illustrate capabilities enabled by an example enhanced interconnect switch.
Figure 8B:
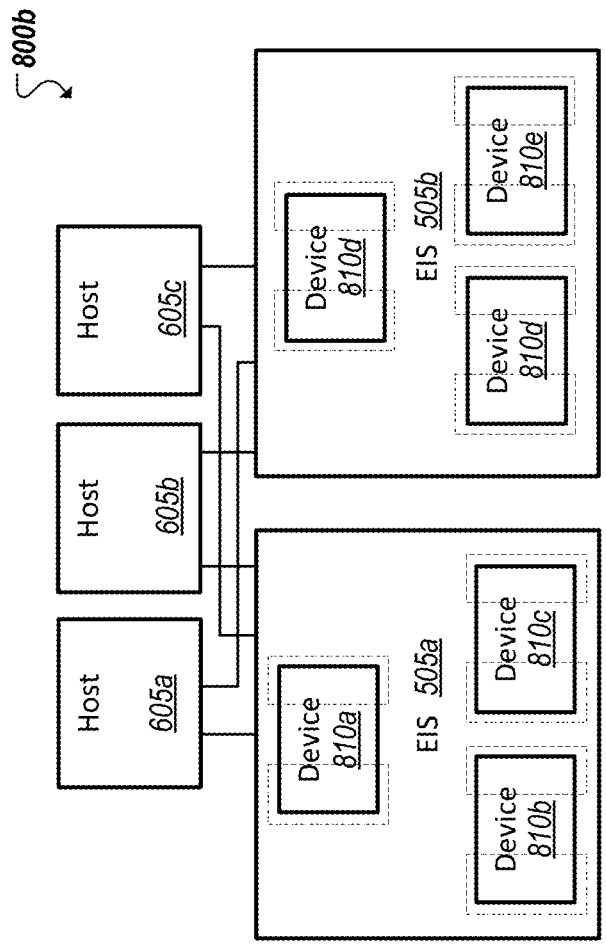

Turning to FIGS. 8A-8B, the processing power of the EIS can enable more sophisticated routing and capabilities, beyond those illustrated in the example of FIGS. 7A-7C. For instance, as shown in the simplified block diagram 800a of FIG. 8A, another capability can be enabled through logic of the EIS's control host to implement virtual devices within the fabric. Accordingly, a Fabric Virtual Devices capability can be supported to present, to one or more hosts (e.g., 605a-c) connected to the upstream ports of the EIS 505, the impression of a direction connection to a particular (virtualized) device. The fact that the device is virtual may be hidden from the host, the host assuming that the device is one of the devices physically connected to downstream ports of one of the EISes in the fabric. Indeed, the hosts may have no visibility into the actual devices (E.g., 610a-d) connected to the downstream ports of the EISes (e.g., 505a-d). The virtual devices (e.g., 805a-g), through the Fabric Virtual Devices (FVD) capability, can make use of the resources of physical devices (e.g., 610a-d) connected to the EIS ports. In some cases, the virtual device may present as a device of the same type as one of the connected devices (610a-d). Indeed, multiple virtual devices can be instantiated to subdivide the resources of a single physical device of the same type. In other cases, the virtual device may be presented to the host as a device of a type different from the physical devices. For instance, the storage capacity of a physically-connected storage device (e.g., 610a) may be utilized to support a virtual storage device of a different type (but, which actually makes use of the storage of the physical device). As an example, the physical devices may be storage devices implementing one particular host interface, but the virtual device(s) may appear to the host(s) as implementing a different host interface. In another example, Fabric Virtual Devices can be used to present the virtual devices as being connected below a PCIe Switch or Switch hierarchy, which may be desirable in some cases by allowing the continued use of PCIe mechanisms for Hot Plug, error reporting, Access Control Services, among other considerations.

The simplified block diagram 800b of FIG. 8B illustrates yet another potential capability of an EIS 505, which can be implemented through the logic and computing capabilities of the embedded control host. In this example, devices are virtualized and presented to one or more hosts (e.g., 605a-c), however, none of the virtual devices map to a physical device connected to the EIS. Using a Host-Host Communication capability (represented in FIG. 8B), the Fabric Virtual Devices capability is leveraged to enable hosts to communicate directly with each other over the fabric provided by the EIS. For instance, virtual devices 810a-f can be provided using the control hosts of one or more EISes (505a-b) that appear to the hosts as NICs, bridge devices, or other devices (e.g., special purpose inter-process communication (IPC) interfaces to support Message Passing Interface (MPI), Sockets, etc.) through which inter-host communication and multi-path redundancy can be facilitated. In one example, the resources of each virtual device (e.g., 810a-f) can be assigned to and shared by two or more of the hosts 605a-c (such as represented in the example of FIG. 8B).

It should be appreciated that the capabilities and use cases illustrated in the examples of FIGS. 7A-8B may be applied individually or in combination within a single topology. For instance, Simple Assignment may be used for some hosts-device assignments, while Virtualized Assignment or Fabric Virtual Devices are utilized for other host-device resources assignments. Further, while this disclosure makes reference to PCIe Links, EIS topologies can be applied in potentially any context using a PCIe-compatible architecture, including on-die fabrics, multi-chip packages (MCPs), system on chips (SOCs), and fabric technologies that support PCIe-compatible I/O operations, among other examples.

In some implementations, EIS-based fabrics can support virtual machine (VM) migration by enabling a local virtual machine manager to be instantiated on the EIS using logic of the control host to maintain a consistent apparent Requester ID (ReqID) by dynamically remapping the actual ReqID in accordance with the migration. For instance, by statically maintaining the ReqID at the control host, a VM can be migrated from one host and/or device to another without incongruences developing in the VT-d tables associated with the guest. While traditional SR-IOV provides various hooks for supporting I/O virtualization, the ReqID, in such implementations is often tied to specific HW, thereby limiting VM migration. However, by ensuring a consistent 1-1 mapping, as provided at the control host of the EIS, VM migration is greatly simplified, enabling VM migration without significant fabric reconfiguration.

In a simple case, a single control host of a single EIS can maintain a single flat view of memory, and use only one Segment to present a flat BDF space to all devices. However, control host(s) may be permitted to establish distinct views of memory, and to use multiple Segments to establish distinct BDF spaces. To track which of several BDF spaces to apply, tags can be maintained to identify each unique BDF space. When multiple BDF spaces are defined across a fabric implemented using multiple EISes, TLP prefixes may be used to carry the BDF space tags from one EIS to another. For instance, existing PCIe TLP prefixes can be repurposed, such as the PASID prefix, or new prefixes can be defined therefor. These prefixes can then be stripped off by the receiving EIS at the edge of the fabric before the corresponding TLPs are transmitted, thereby maintaining the view of any given device or worker host of a single unitary view of memory and BDF spaces.

In some implementations, each EIS can be further provided with at least memory management unit (MMU) controller, owned by the EIS's control host. The control host can utilize the MMU to perform mappings from one memory space to another. Consistent with IOV/VT-d, the mappings may be indexed by BDF, with an additional index for Segments when applicable. These MMUs can be maintained consistently within a fabric, although it is not necessary that all MMUs support all mappings currently in use (such as when an EIS fabric has been divided such that certain devices are only mapped to certain worker hosts). The MMU can also be used by the control host when supporting SR-IOV to worker hosts. The MMU mapping tables may use the same format as conventional page tables. In some implementations, an MMU can include one or more translation caches (TLBs).

In some implementations, an EIS fabric can support MSI and MSI-X for the interrupts generated by the EIS switch logic itself. It is permissible that in the same fabric some worker hosts may use MSI while others use MSI-X. MSI/MSI-X interrupts will generally pass through an EIS with memory and Segment/BDF space re-mapping. An EIS may optionally support sub-page level remapping to enable the gathering of interrupts from multiple disparate addresses or memory spaces, allowing them to be mapped within a single page, or conversely to scatter interrupts that appear to be within a single page to multiple disparate addresses or memory spaces (e.g., by extending the page translation logic of the EIS ports).

Errors associated with Functions, including ERR_Messages, may generally pass through the EIS when Simple Assignment is used, or when virtualization is done at the Function level. However, if a control host is providing virtual assignments at the sub-Function level, the control host will then emulate the behaviors required by the worker host, which may include synthesizing ERR Messages to a worker host, or multicasting ERR Messages when multiple worker hosts are affected by an error associated with a particular Function, among other examples.

In some implementations, EIS port functions can be controlled by the control host, with the worker hosts' view of the port control virtualized. For instance, port management can involve the control host the setting Slot Power Limit at Downstream Ports is set by the control host based on the appropriate power limit(s) for devices in a given chassis. The Slot Power Limit received at the Upstream Ports from worker hosts may be ignored in some instances, as the individual worker hosts may not generally comprehend the actual requirements of the chassis in which they are operating. In one example, a Device Readiness Status (DRS) Message may be transmitted (e.g., consistent with PCIe) by the control host at Upstream Ports to indicate to a worker host that the control host has configured the EIS fabric exposed to that worker host. A DRS Message received by the EIS at a Downstream Port may be used by the control host to optimize the initial configuration of a device.

Figure 9:
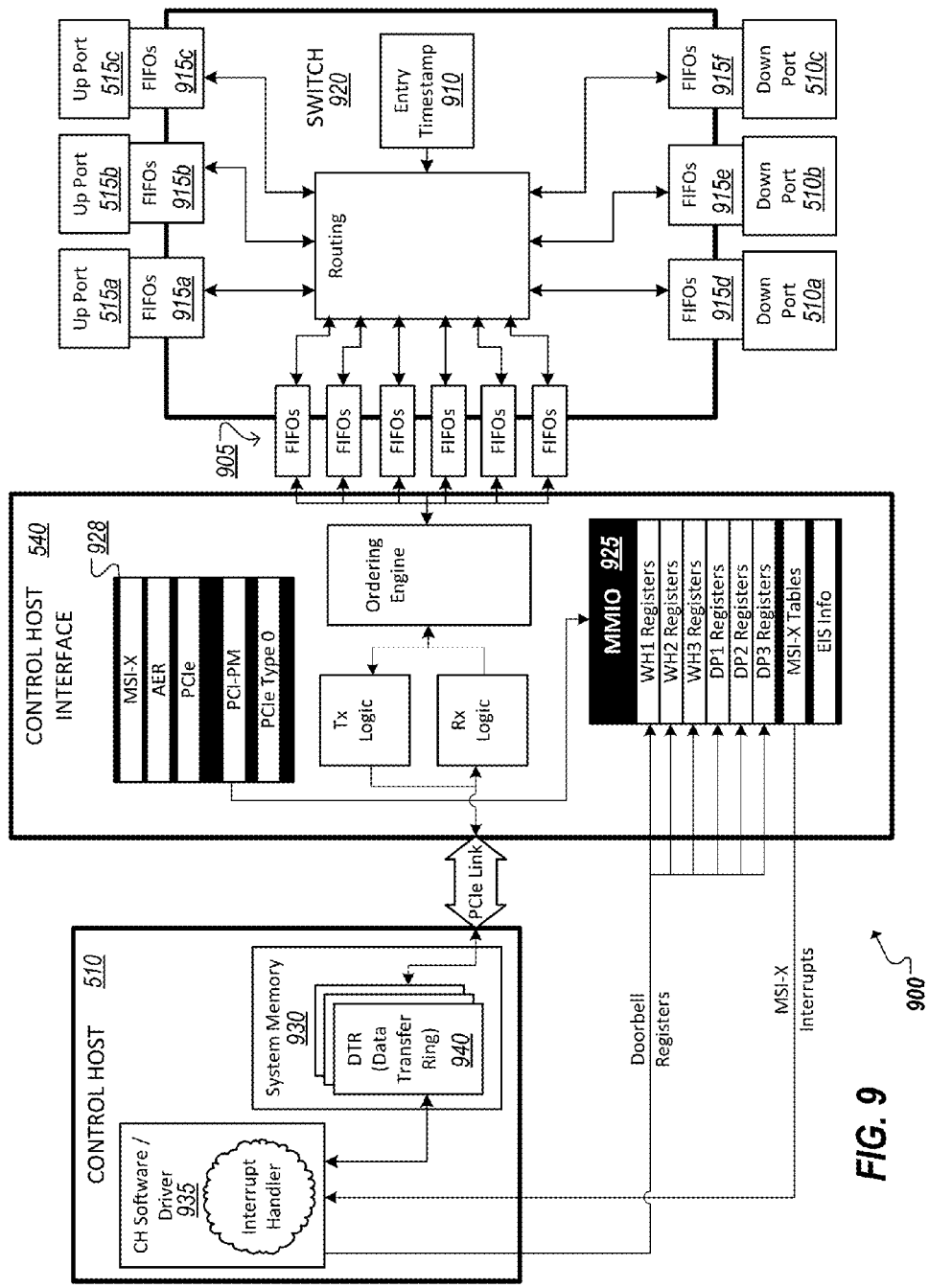
FIG. 9 illustrates an example embodiment of an enhanced interconnect switch (EIS).
Figure 10:
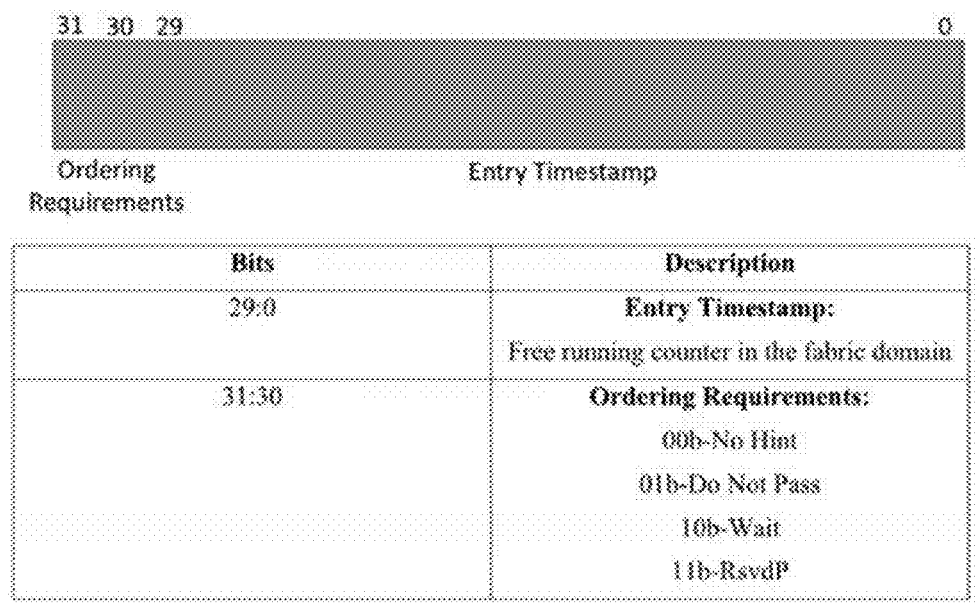
FIG. 10 illustrates an example entry timestamp structure.

Turning to FIG. 9, a simplified block diagram 900 is shown illustrating an example implementation of an EIS 505 including a control host 510 and switch-control host interface (SCHI) 540. In one implementation, the SCHI 540 may have a 4 KB minimum (or other sized) clock domain crossing (CDC) (or other clock domain (e.g., the control host may share a clock domain with switch 920)) first-in first-out (FIFO) queues (e.g., 905) in each direction for each type of transaction (e.g., posted, non-posted, completions) per port. These FIFO queues may be pre-allocated. In some examples, the EIS may maintain a 32 bit register out of which the lower 30 bits are used as a free running counter in its fabric clock domain called the Entry Timestamp (e.g., 910). This register may be visible to all the ports in their respective clock domains after appropriate clock domain crossing. The remaining bits of the register (e.g., Bits 30 and 31) may be used for special Ordering Requirements (such as illustrated in FIG. 10). In some examples, every port that receives a TLP appends the EIS Entry Timestamp to it before pushing it in the CDC FIFO. In one example, all the ports (e.g., 510a-c, 515a-c) of the EIS are to sample the Entry Timestamp 910 value at the same time relative to storing the transactions in the CDC FIFOs. The reset value of the Entry Timestamp register may be set to 0.

As noted, each port may maintain separate queues (e.g., 915a-f) in each direction for each transaction type (e.g., one each for Posted, Non-Posted, and Completion transactions, i.e., 6 in total). These queues (e.g., 915a-f) may be used to pass the transactions from the local port domains to the fabric domain. The SCHI may likewise maintain separate queues (e.g., 905) per port in each direction (e.g., one each for Posted, Non-Posted and Completion transactions, i.e., 6 in total per port). The SCHI queues may be used to transfer the TLPs between the EIS switching fabric (e.g., 920) and the SCHI 540.

In one implementation, the SCHI of an EIS may also include a memory mapped IO (MMIO) space 925, in addition to the PCI- and PCIe-required Configuration register sets (e.g., 928. The interfaces (e.g., SCHI or MMIO) may further include a Base Address Register (BAR), into which MMIO registers, such as those defined below in Table 3, may be mapped.

TABLE 3

MMIO Registers

| Byte Offset (hex) | Register Attribute | Size (B) | Field Name | Description (Type/Default) |
|---|---|---|---|---|
| 0000 | RO | 2 | Version | Version of this register interface definition. Default0 |
| 0002 | HwInit | 1 | Num_UP | Number of Upstream Ports |
| 0003 | HwInit | 1 | Num_DP | Number of Downstream Ports |
| 0004 | HwInit | 2 | Reg_Bank_Offset | Points to the start of the registers specific to each port |
| 0005 | RO | 2 | RsvdP | Default 0 |
| Repeat this block for each Port | | | | |
| Reg_Bank_Offset/ Next_Reg_Offset+0000 | RO | 1 | Port ID | Unique Port ID |
| Reg_Bank_Offset/ NextReg_Offset+0001 | RO | 1 | Port Type | Indicates whether the port is an upstream port or a downstream port 00h-Downstream Port 01h-Upstream Port |
| Reg_Bank_Offset/ NextReg_Offset+0002 | RO | 2 | Next_Reg_Offset | Points to the next set of registers for another port. To be set to 0000h for the last port. |
| Reg_Bank_Offset/ NextReg_Offset+0004 | RO | 2 | Port_Status | Bit0: EIS_Attached Set to indicate If Port Type=0001h then UP is connected to the DP of another EIS, or If Port Type=0000h then DP is connected to the UP of another EIS Bit 15:1: RsvdP |
| Reg_Bank_Offset/ NextReg_Offset+0006 | RW | 2 | Port_Control | Bit 0: Enable Bit 15:1 RsvdP |
| Reg_Bank_Offset / NextReg_Offset+0008 | RW/RO | 4 | Posted Doorbell Register | Doorbell register for the CH to indicate a posted transaction is ready to be picked up |
| Reg_Bank_Offset/ NextReg_Offset+000C | RW/RO | 4 | Non-Posted Doorbell Register | Doorbell register for the CH to indicate a non-posted transaction is ready to be picked up |
| Reg_Bank_Offset/ NextReg_Offset+0010 | RW/RO | 4 | Completion Doorbell Register | Doorbell register for the CH to indicate a Completion transaction is ready to be picked up |
| Reg_Bank_Offset/ NextReg_Offset+0014 | RW | 4 | QCI2CH Posted Data Transfer Ring Address Lo | Address to which the QCI will issue a memory write transaction when transferring a Posted transaction to the CH |
| Reg_Bank_Offset/ NextReg_Offset+0018 | RW | 4 | QCI2CH Posted Data Transfer Ring Address Hi | Address to which the QCI will issue a memory write transaction when transferring a Posted transaction to the CH |
| Reg_Bank_Offset/ NextReg_Offset+001C | RW | 4 | QCI2CH Posted Ring Size | Size of the transferring in DW |
| Reg_Bank_Offset/ NextReg_Offset+0020 | RW | 4 | QCI2CH Posted Ring Dequeue Pointer Lo | Value of the Dequeue pointer. This is written by the CH. The value read by the software (SW) is indeterminate. |
| Reg_Bank_Offset/ NextReg_Offset+0024 | RW | 4 | QCI2CH Posted Ring Dequeue Pointer Hi | Value of the Dequeue pointer. This is written by the CH. The value read by the SW is indeterminate. |
| Reg_Bank_Offset/ NextReg_Offset+0028 | RW | 4 | QCI2CH Non-Posted Data Transfer Ring Address Lo | Address to which the QCI will issue a memory write transaction when transferring a Non-Posted transaction to the CH |
| Reg_Bank_Offset/ NextReg_Offset+002C | RW | 4 | QCI2CH Non-Posted Data Transfer Ring Address Hi | Address to which the QCI will issue a memory write transaction when transferring a Non-Posted transaction to the CH |
| Reg_Bank_Offset/ NextReg_Offset+0030 | RW | 4 | QCI2CH Non-Posted Ring Size | Size of the transferring in DW |

TABLE 3-continued

MMIO Registers

| Byte Offset (hex) | Register Attribute | Size (B) | Field Name | Description (Type/Default) |
|---|---|---|---|---|
| Reg_Bank_Offset/ NextReg_Offset+0034 | RW | 4 | QCI2CH Non-Posted Ring Dequeue Pointer Lo | Value of the Dequeue pointer. This is written by the CH. The value read by the SW is indeterminate. |
| Reg_Bank_Offset/ NextReg_Offset+0038 | RW | 4 | QCI2CH Non-Posted Ring Dequeue Pointer Hi | Value of the Dequeue pointer. This is written by the CH. The value read by the SW is indeterminate. |
| Reg_Bank_Offset/ NextReg_Offset+003C | RW | 4 | QCI2CH Completion Data Transfer Ring Address Lo | Address to which the QCI will issue a memory write transaction when transferring a Completion transaction to the CH |
| Reg_Bank_Offset/ NextReg_Offset+0040 | RW | 4 | QCI2CH Completion Data Transfer Ring Address Hi | Address to which the QCI will issue a memory write transaction when transferring a Completion transaction to the CH |
| Reg_Bank_Offset/ NextReg_Offset+0044 | RW | 4 | QCI2CH Completion Ring Size | Size of the transferring in DW |
| Reg_Bank_Offset/ NextReg_Offset+0048 | RW | 4 | QCI2CH Completion Ring Dequeue Pointer Lo | Value of the Dequeue pointer. This is written by the CH. The value read by the SW is indeterminate. |
| Reg_Bank_Offset/ NextReg_Offset+004C | RW | 4 | QCI2CH Completion Ring Dequeue Pointer Hi | Value of the Dequeue pointer. This is written by the CH. The value read by the SW is indeterminate. |
| Reg_Bank_Offset/ NextReg_Offset+0050 | RW | 4 | CH2QCI Posted Data Transfer Ring Address Lo | Address from which the QCI will read a DRB when the corresponding doorbell register is set by the CH. Appropriate offset from the local copy of the Dequeue pointer is added to this Address. |
| Reg_Bank_Offset/ NextReg_Offset+0054 | RW | 4 | CH2QCI Posted Data Transfer Ring Address Hi | Address from which the QCI will read a DRB when the corresponding doorbell register is set by the CH. Appropriate offset from the local copy of the Dequeue pointer is added to this Address. |
| Reg_Bank_Offset/ NextReg_Offset+0058 | RW | 4 | CH2QCI Posted Ring Dequeue Pointer Address Lo | The address to which the QCI must issue a MemWr with the Dequeue Pointer value as the payload |
| Reg_Bank_Offset/ NextReg_Offset+005C | RW | 4 | CH2QCI Posted Ring Dequeue Pointer Address Hi | The address to which the QCI must issue a MemWr with the Dequeue Pointer value as the payload |
| Reg_Bank_Offset/ NextReg_Offset+0060 | RW | 4 | CH2QCINon-PostedData Transfer Ring Address Lo | Address from which the QCI will read a DRB when the corresponding doorbell register is set by the CH. Appropriate offset from the local copy of the Dequeue pointer is added to this Address. |
| Reg_Bank_Offset/ NextReg_Offset+0064 | RW | 4 | CH2QCI Non-Posted Data Transfer Ring Address Hi | Address from which the QCI will read a DRB when the corresponding doorbell register is set by the CH. Appropriate offset from the local copy of the Dequeue pointer is added to this Address. |
| Reg_Bank_Offset/ NextReg_Offset+0068 | RW | 4 | CH2QCI Non-Posted Ring Dequeue Pointer Address Lo | The address to which the QCI must issue a MemWr with the Dequeue Pointer value as the payload |

TABLE 3-continued

MMIO Registers

| Byte Offset (hex) | Register Attribute | Size (B) | Field Name | Description (Type/Default) |
| --- | --- | --- | --- | --- |
| Reg_Bank_Offset/ NextReg_Offset+006C | RW | 4 | CH2QCI Non-Posted Ring Dequeue Pointer Address Hi | The address to which the QCI must issue a MemWr with the Dequeue Pointer value as the payload |
| Reg_Bank_Offset/ NextReg_Offset+0070 | RW | 4 | CH2QCI Completion Data Transfer Ring Address Lo | Address from which the QCI will read a DRB when the corresponding doorbell register is set by the CH. Appropriate offset from the local copy of the Dequeue pointer is added to this Address. |
| Reg_Bank_Offset/ NextReg_Offset+0074 | RW | 4 | CH2QCI Completion Data Transfer Ring Address Hi | Address from which the QCI will read a DRB when the corresponding doorbell register is set by the CH. Appropriate offset from the local copy of the Dequeue pointer is added to this Address. |
| Reg_Bank_Offset/ NextReg_Offset+0078 | RW | 4 | CH2QCI Completion Ring Dequeue Pointer Address Lo | The address to which the QCI must issue a MemWr with the Dequeue Pointer value as the payload |
| Reg_Bank_Offset/ NextReg_Offset+007C | RW | 4 | CH2QCI Completion Ring Dequeue Pointer Address Hi | The address to which the QCI must issue a MemWr with the Dequeue Pointer value as the payload |

Figure 11:
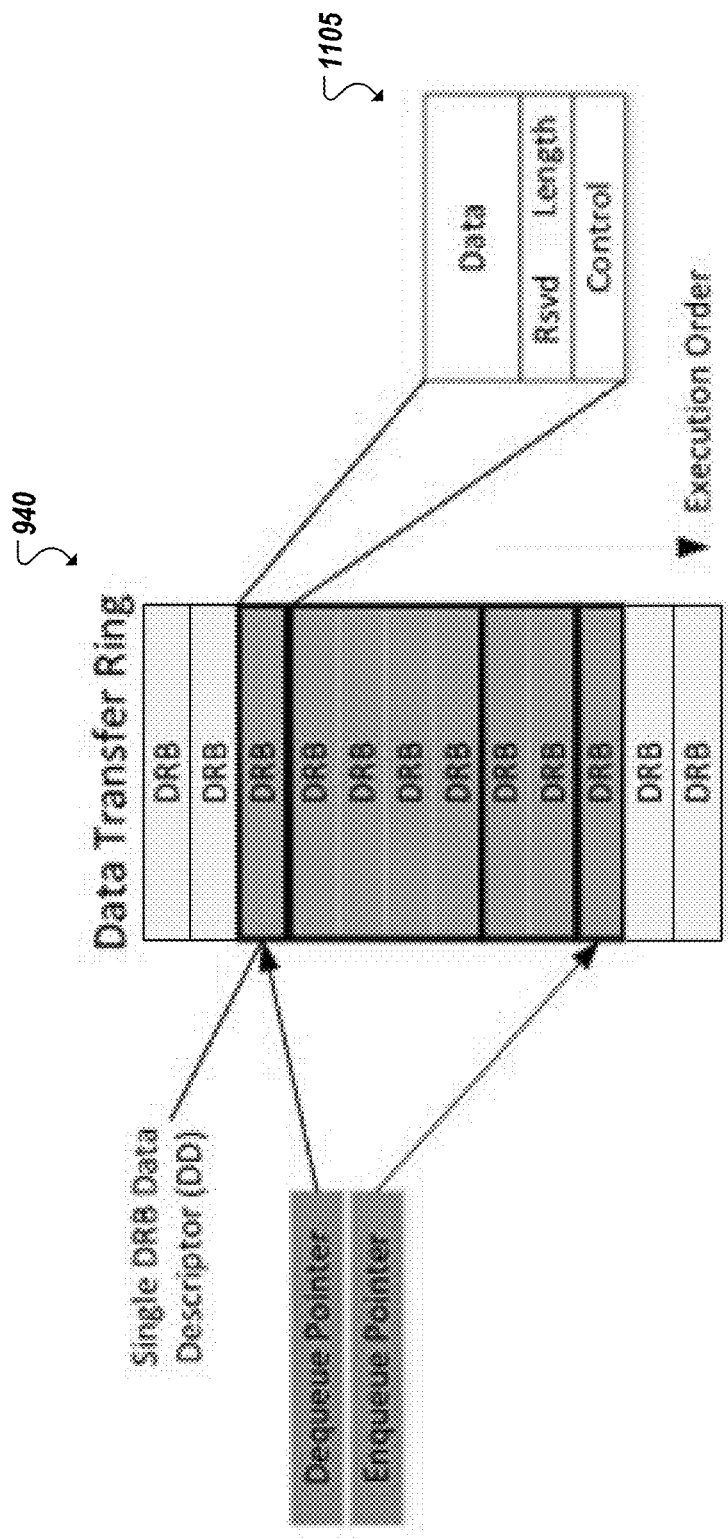
FIG. 11 illustrates an example data transfer ring (DTR) of a control host of an EIS.

A shown in the example implementation of FIG. 9, the control host 510 of an EIS may include its own system memory 930 for use in supporting the logic implemented as code (e.g., 935) executable by the control host processor. In one example, a Data Transfer Ring (DTR) 940 can be implemented in the control host system memory 930. Turning to FIG. 11, a simplified block diagram 1100 illustrates a representation of one implementation of a DTR 940. For instance, the DTR 940 can be implemented as a circular buffer consisting of Data Ring Buffers. A Data Ring Buffer (DRB) can be used by the control host software and the SCHI to schedule work for each other. For instance, the DTR 940 can implement a queue through which data contained each DRB 1105 can be moved between the control host and the SCHI. The control host software, among other functionality, can be executable to allocate and initialize the DRB structures in the control host memory for each port of the EIS in each direction (e.g., two per EIS port). The control host software can then write the address to the buffer in memory (e.g., in the SCHI's MIMIO space 925), among other example features. FIG. 12 provides an example of a data transfer DRB 1105).

Figure 13:
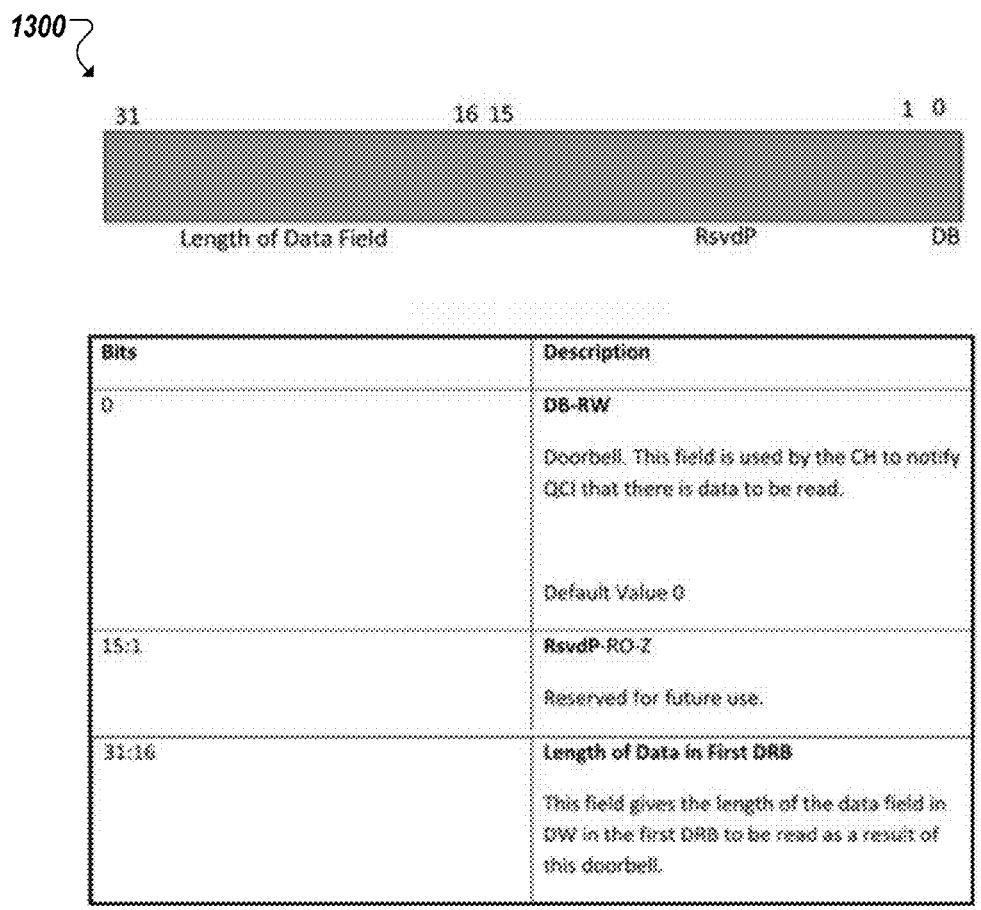
FIG. 13 illustrates an example doorbell register used in an EIS.

Returning to FIG. 9, an implementation of a SCHI 540 can additionally maintain a set of doorbell registers for each transaction type for each port (such as represented in the block diagram 1300 of FIG. 13). The doorbell registers can be used, for instance, to request service from the Switch 920 for data (e.g. TLPs to be transmitted, or configuration commands to the Switch 920 itself) placed by the control host by means of the SCHI in the FIFOs that flow from control host to the Switch 920, among other example uses.

Figure 14:
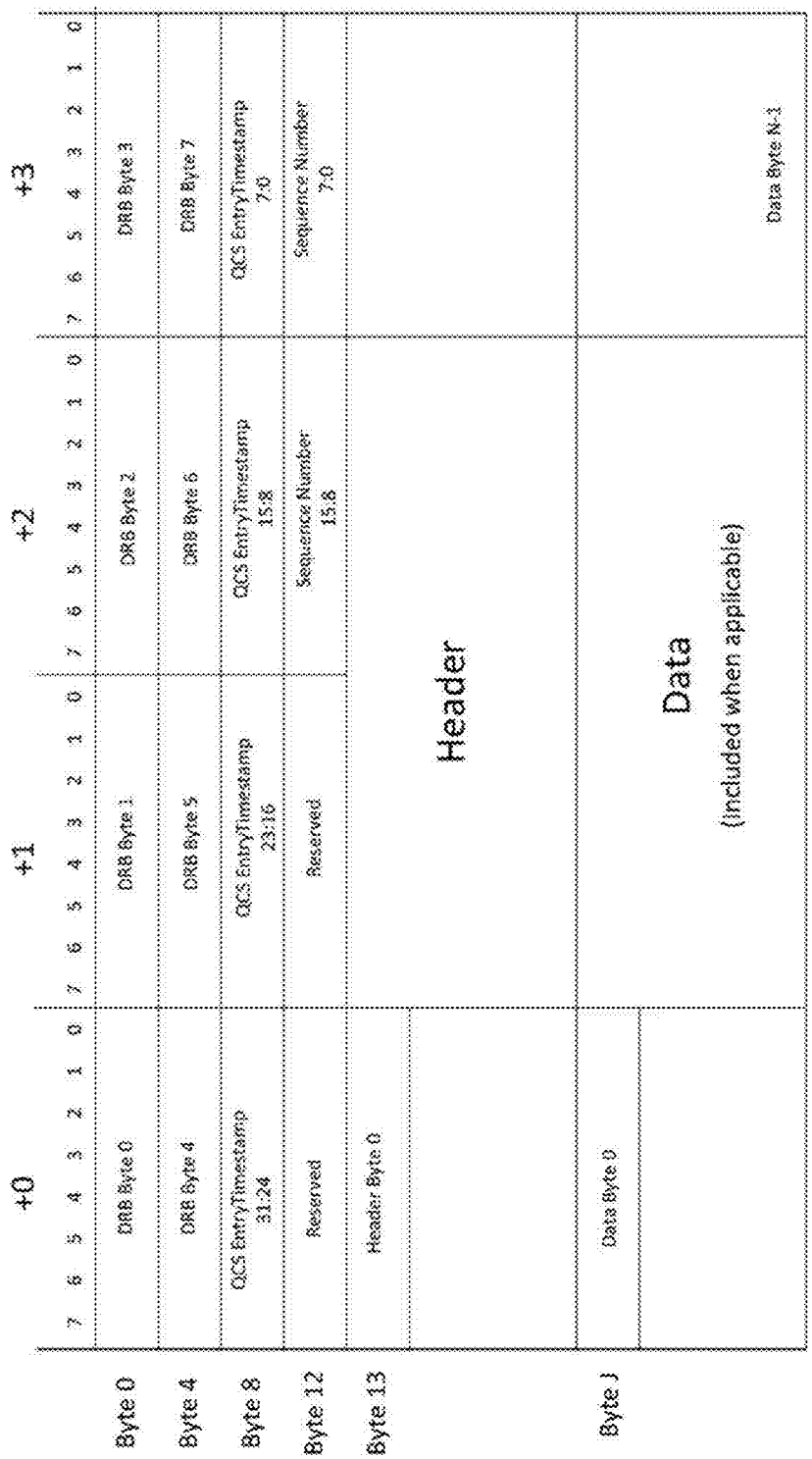
FIG. 14 illustrates a representation of an example data structure used in an EIS.

Turning to FIG. 14, the data structures used to represent received TLPs and to-be transmitted TLPs in the control host memory may be the same. For instance, each data structure (e.g., 1400) can indicate the respective DRB, which is to include the corresponding TLP (as its data payload). The data structure (e.g., 1400) can further include the corresponding EIS Entry Timestamp value (e.g., as described above), for instance, to support selective TLP bypassing when enabled in the EIS switching logic. Finally, the data structure (e.g., 1400) can include the TLP itself, exactly as received (byte for byte), including sequence number, TLP headers, data payload, cyclic redundancy check value (LCRC), but with the start of TLP (STP) and end of TLP (END) symbols excluded in one implementation (such as shown in FIG. 14). An identifier of the port, which received the TLP, may also be omitted in some implementations of the data structure (e.g., 1400) as the port may be implicit based on the location of the memory buffer, among other example features and considerations. Instances of data structure 1400 can be used in the control host system memory (930) to manage each TLP received or transmitted (i.e. sent to or from) the control host.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 15:
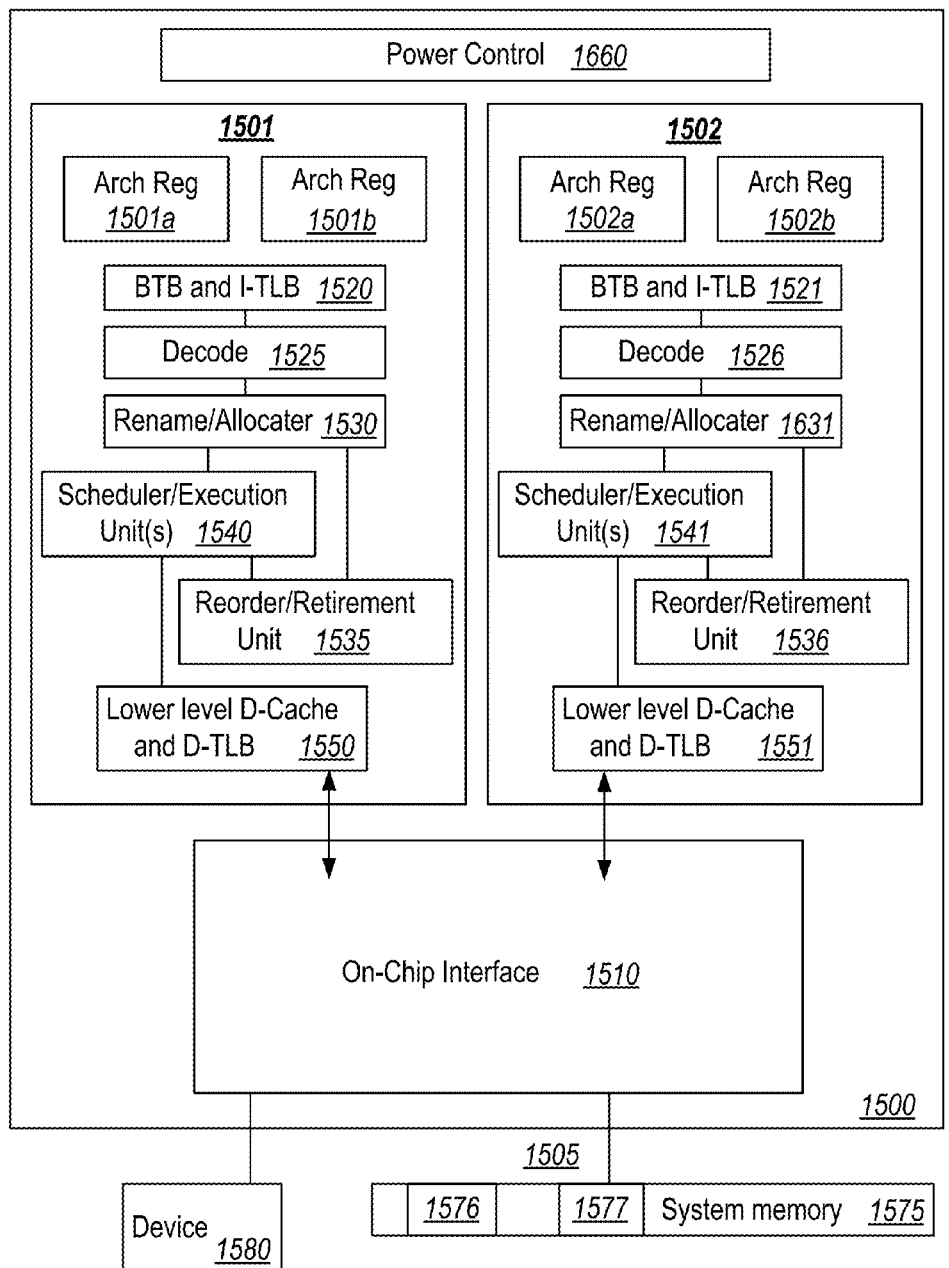
FIG. 15 illustrates an embodiment of a block diagram for a computing system including a multicore processor.

Referring to FIG. 15, an embodiment of a block diagram for a computing system including a multicore processor is depicted. Processor 1500 includes any processor or processing device, such as a microprocessor, an embedded processor, a digital signal processor (DSP), a network processor, a handheld processor, an application processor, a co-processor, a system on a chip (SOC), or other device to execute code. Processor 1500, in one embodiment, includes at least two cores—core 1501 and 1502, which may include asymmetric cores or symmetric cores (the illustrated embodiment). However, processor 1500 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1500, as illustrated in FIG. 15, includes two cores—core 1501 and 1502. Here, core 1501 and 1502 are considered symmetric cores, i.e. cores with the same configurations, functional units, and/or logic. In another embodiment, core 1501 includes an out-of-order processor core, while core 1502 includes an in-order processor core. However, cores 1501 and 1502 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such as a binary translation, may be utilized to schedule or execute code on one or both cores. Yet to further the discussion, the functional units illustrated in core 1501 are described in further detail below, as the units in core 1502 operate in a similar manner in the depicted embodiment.

As depicted, core 1501 includes two hardware threads 1501a and 1501b, which may also be referred to as hardware thread slots 1501a and 1501b. Therefore, software entities, such as an operating system, in one embodiment potentially view processor 1500 as four separate processors, i.e., four logical processors or processing elements capable of executing four software threads concurrently. As alluded to above, a first thread is associated with architecture state registers 1501a, a second thread is associated with architecture state registers 1501b, a third thread may be associated with architecture state registers 1502a, and a fourth thread may be associated with architecture state registers 1502b. Here, each of the architecture state registers (1501a, 1501b, 1502a, and 1502b) may be referred to as processing elements, thread slots, or thread units, as described above. As illustrated, architecture state registers 1501a are replicated in architecture state registers 1501b, so individual architecture states/contexts are capable of being stored for logical processor 1501a and logical processor 1501b. In core 1501, other smaller resources, such as instruction pointers and renaming logic in allocator and renamer block 1530 may also be replicated for threads 1501a and 1501b. Some resources, such as re-order buffers in reorder/retirement unit 1535, ILTB 1520, load/store buffers, and queues may be shared through partitioning. Other resources, such as general purpose internal registers, page-table base register(s), low-level data-cache and data-TLB 1515, execution unit(s) 1540, and portions of out-of-order unit 1535 are potentially fully shared.

Processor 1500 often includes other resources, which may be fully shared, shared through partitioning, or dedicated by/to processing elements. In FIG. 15, an embodiment of a purely exemplary processor with illustrative logical units/resources of a processor is illustrated. Note that a processor may include, or omit, any of these functional units, as well as include any other known functional units, logic, or firmware not depicted. As illustrated, core 1501 includes a simplified, representative out-of-order (OOO) processor core. But an in-order processor may be utilized in different embodiments. The OOO core includes a branch target buffer 1520 to predict branches to be executed/taken and an instruction-translation buffer (I-TLB) 1520 to store address translation entries for instructions.

Core 1501 further includes decode module 1525 coupled to fetch unit 1520 to decode fetched elements. Fetch logic, in one embodiment, includes individual sequencers associated with thread slots 1501a, 1501b, respectively. Usually core 1501 is associated with a first ISA, which defines/specifies instructions executable on processor 1500. Often machine code instructions that are part of the first ISA include a portion of the instruction (referred to as an opcode), which references/specifies an instruction or operation to be performed. Decode logic 1525 includes circuitry that recognizes these instructions from their opcodes and passes the decoded instructions on in the pipeline for processing as defined by the first ISA. For example, as discussed in more detail below decoders 1525, in one embodiment, include logic designed or adapted to recognize specific instructions, such as transactional instruction. As a result of the recognition by decoders 1525, the architecture or core 1501 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1526, in one embodiment, recognize the same ISA (or a subset thereof). Alternatively, in a heterogeneous core environment, decoders 1526 recognize a second ISA (either a subset of the first ISA or a distinct ISA).

In one example, allocator and renamer block 1530 includes an allocator to reserve resources, such as register files to store instruction processing results. However, threads 1501a and 1501b are potentially capable of out-of-order execution, where allocator and renamer block 1530 also reserves other resources, such as reorder buffers to track instruction results. Unit 1530 may also include a register renamer to rename program/instruction reference registers to other registers internal to processor 1500. Reorder/retirement unit 1535 includes components, such as the reorder buffers mentioned above, load buffers, and store buffers, to support out-of-order execution and later in-order retirement of instructions executed out-of-order.

Scheduler and execution unit(s) block 1540, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1550 are coupled to execution unit(s) 1540. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1501 and 1502 share access to higher-level or further-out cache, such as a second level cache associated with on-chip interface 1510. Note that higher-level or further-out refers to cache levels increasing or getting further way from the execution unit(s). In one embodiment, higher-level cache is a last-level data cache—last cache in the memory hierarchy on processor 1500—such as a second or third level data cache. However, higher level cache is not so limited, as it may be associated with or include an instruction cache. A trace cache—a type of instruction cache—instead may be coupled after decoder 1525 to store recently decoded traces. Here, an instruction potentially refers to a macro-instruction (i.e. a general instruction recognized by the decoders), which may decode into a number of micro-instructions (micro-operations).

In the depicted configuration, processor 1500 also includes on-chip interface module 1510. Historically, a memory controller, which is described in more detail below, has been included in a computing system external to processor 1500. In this scenario, on-chip interface 1510 is to communicate with devices external to processor 1500, such as system memory 1575, a chipset (often including a memory controller hub to connect to memory 1575 and an I/O controller hub to connect peripheral devices), a memory controller hub, a northbridge, or other integrated circuit. And in this scenario, bus 1505 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1575 may be dedicated to processor 1500 or shared with other devices in a system. Common examples of types of memory 1575 include DRAM, SRAM, non-volatile memory (NV memory), and other known storage devices. Note that device 1580 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1500. For example in one embodiment, a memory controller hub is on the same package and/or die with processor 1500. Here, a portion of the core (an on-core portion) 1510 includes one or more controller(s) for interfacing with other devices such as memory 1575 or a graphics device 1580. The configuration including an interconnect and controllers for interfacing with such devices is often referred to as an on-core (or un-core configuration). As an example, on-chip interface 1510 includes a ring interconnect for on-chip communication and a high-speed serial point-to-point link 1505 for off-chip communication. Yet, in the SOC environment, even more devices, such as the network interface, co-processors, memory 1575, graphics processor 1580, and any other known computer devices/interface may be integrated on a single die or integrated circuit to provide small form factor with high functionality and low power consumption.

In one embodiment, processor 1500 is capable of executing a compiler, optimization, and/or translator code 1577 to compile, translate, and/or optimize application code 1576 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 16:
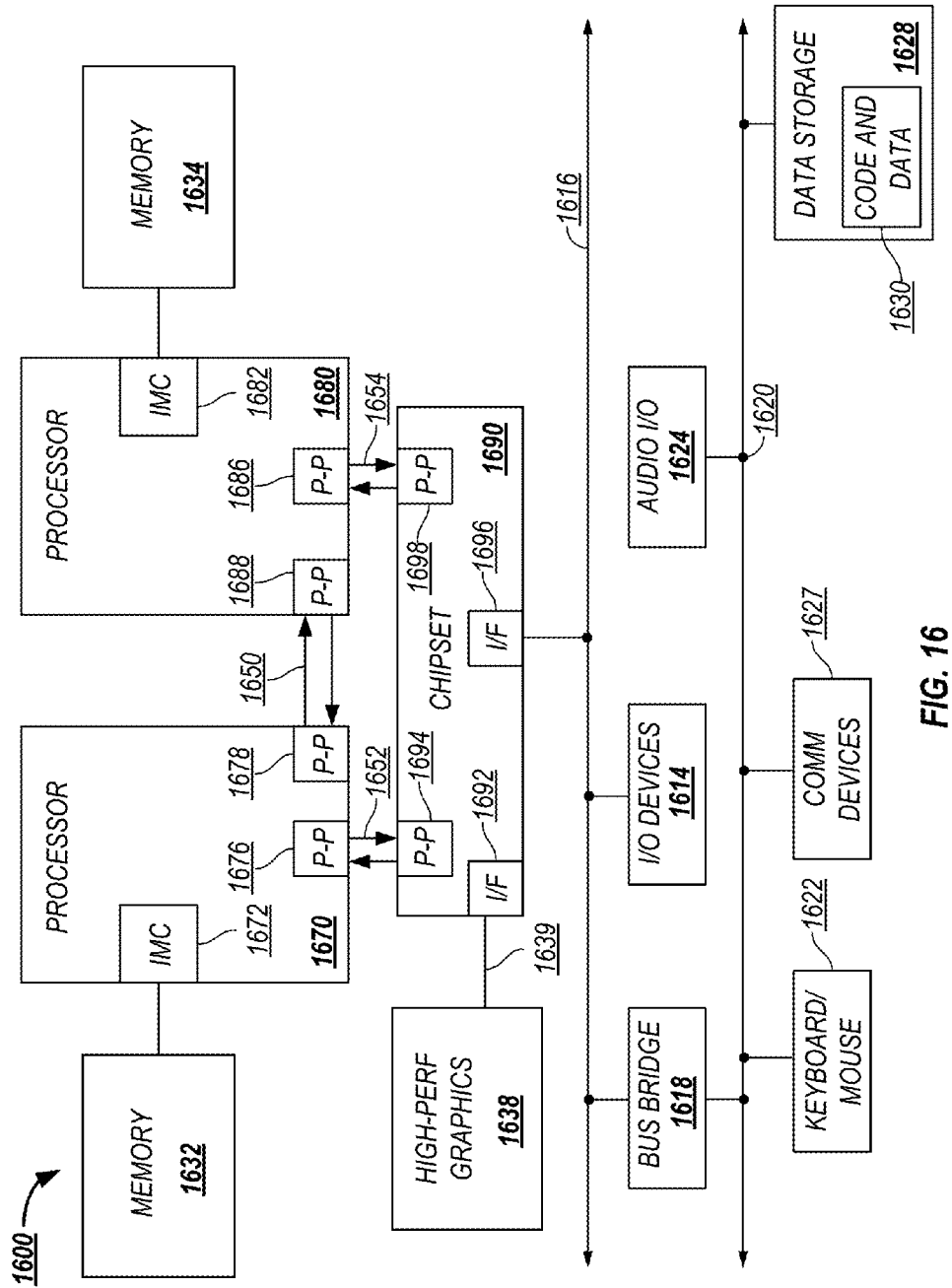
FIG. 16 illustrates another embodiment of a block diagram for a computing system.

Referring now to FIG. 16, shown is a block diagram of a second system 1600 in accordance with an embodiment of the present invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of a processor. In one embodiment, 1652 and 1654 are part of a serial, point-to-point coherent interconnect fabric, such as Intel's Quick Path Interconnect (QPI) architecture. As a result, the invention may be implemented within the QPI architecture.

While shown with only two processors 1670, 1680, it is to be understood that the scope of the present invention is not so limited. In other embodiments, one or more additional processors may be present in a given processor.

Processors 1670 and 1680 are shown including integrated memory controller units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 each exchange information with a chipset 1690 via individual P-P interfaces 1652, 1654 using point to point interface circuits 1676, 1694, 1686, 1698. Chipset 1690 also exchanges information with a high-performance graphics circuit 1638 via an interface circuit 1692 along a high-performance graphics interconnect 1639.

A shared cache (not shown) may be included in either processor or outside of both processors; yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 are coupled to first bus 1616, along with a bus bridge 1618 which couples first bus 1616 to a second bus 1620. In one embodiment, second bus 1620 includes a low pin count (LPC) bus. Various devices are coupled to second bus 1620 including, for example, a keyboard and/or mouse 1622, communication devices 1627 and a storage unit 1628 such as a disk drive or other mass storage device which often includes instructions/code and data 1630, in one embodiment. Further, an audio I/O 1624 is shown coupled to second bus 1620. Note that other architectures are possible, where the included components and interconnect architectures vary. For example, instead of the point-to-point architecture of FIG. 16, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

The following examples pertain to embodiments in accordance with this Specification. One or more embodiments may provide a method, a system, a machine readable storage medium with executable code, or switch including switching logic executable to facilitate a Peripheral Component Interconnect Express (PCIe)-based interconnect, and further including a control host embedded in the switch to provide one or more enhanced routing capabilities. The control host can include a processor device, memory, and software executable by the processor device to process traffic received at one or more ports of the switch to redirect at least a portion of the traffic to provide the one or more enhanced routing capabilities.

In one example, the processor device and memory are dedicated for the control host.

In one example, the enhanced routing capabilities include a simple assignment capability to assign one or more devices at one or more downstream ports of the switch to a particular host connected to an upstream port of the switch, the one or more devices include a subset of the devices connected to downstream ports of the switch, and the devices outside the subset of devices are invisible to the particular host.

In one example, the software is further executable to dynamically reassign at least a particular one of the devices outside the subset of devices to the particular host without changing the connection of the particular device to the switch.

In one example, the enhanced routing capabilities include a virtual assignment capability, the software is executable to define virtual partitions of resources provided by a particular device communicatively coupled to the switch, and assign each partition to a respective one of a set of hosts communicatively coupled to the switch.

In one example, the particular device does not natively support input/output virtualization (IOV).

In one example, the at least a portion of the set of hosts are directly connected to the switch using one or more upstream ports of the switch, one or more downstream ports of the switch are to interconnect to upstream ports of one or more other switches in a multi-tier architecture to provide multi-path redundancy between the particular device and the set of hosts, the particular device connects to a downstream port of particular one of the other switches, and each of the one or more other switches includes a respective control host to support the virtual assignment capability.

In one example, the set of hosts includes a plurality of hosts, at least one of the set of hosts is connected to an upstream port of another one of the other switches, the virtual partitions include a plurality of virtual partitions, a first one of the virtual partitions is assigned to a first one of the set of hosts, and a second one of the virtual partitions is assigned to a second one of the set of hosts.

In one example, the enhanced routing capabilities include a virtual device capability, the software is executable to instantiate one or more virtual devices hosted on the switch, a downstream port of the switch connects to at least one particular device, an upstream port of the switch connects to at least one particular host, at least a particular one of the virtual devices is to utilize resources of the particular device, and at least a portion of resources of the particular virtual device is assigned to the particular host.

In one example, the particular device is invisible to the particular host.

In one example, the particular virtual device is emulated as a device different from the particular device.

In one example, the enhanced routing capabilities include a host-to-host communication capability including provisioning one or more virtual devices on the switch, assigning access to two or more hosts to a particular virtual device, and the particular virtual device facilitates communication between the two or more hosts.

In one example, the particular virtual device includes a virtual network interface controller (NIC).

In one example, the switch further includes a control host interface between the control host and switching logic.

In one example, the switch further includes a plurality of upstream ports and a plurality of downstream ports.

In one example, each of the ports includes I/O logic for address translation.

In one example, an existing PCIe address space is utilized when providing the enhanced routing capabilities.

In one example, the switch lacks control flow functionality.

In one example, the traffic includes PCIe-compliant transaction layer packets (TLPs), and the TLPs are to be transmitted un-encapsulated and unsegmented.

In one example, the enhanced routing capabilities include a simple assignment capability to dynamically assign devices at one or more downstream ports of the switch to respective hosts connected to one or more upstream ports of the switch, a virtual assignment capability to define virtual partitions of resources provided by devices at one or more downstream ports of the switch and assign each partition to respective hosts connected to one or more upstream ports of the switch, and a virtual device capability to instantiate one or more virtual devices to be hosted on the switch, where the virtual devices utilize resources of one or more devices at one or more downstream ports of the switch, and each virtual device is assigned to respective hosts connected to one or more upstream ports of the switch.

One or more embodiments may provide a method, a system, a machine readable storage medium with executable code to receive, at a control host including a processor device, a transaction layer packet through an interface, where the control host is embedded in a Peripheral Component Interconnect Express (PCIe)-compliant switch and the interface facilitates communication between the control host and switching logic of the control host. A destination of the packet can be determined from the transaction layer packet, and the control host can generate a virtual device to be hosted on the switch and direct the transaction layer packet to the virtual device. The virtual device can consume resources of one or more physical devices connected to one or more downstream ports of the switch and hide the one or more physical devices from a host connected to an upstream port of the switch.

One or more embodiments may provide a system including a plurality of hosts each with a respective processor device, a plurality of devices, and a switch including a control host. The plurality of hosts can be connected to a plurality of upstream ports of the switch, and the plurality of devices can be connected to a plurality of downstream ports of the switch. The control host can include a dedicated processor device, memory, and software executable by the processor device to process traffic received at one or more ports of the switch to redirect at least a portion of the traffic to provide one or more enhanced routing capabilities.

In one example, the switch further includes Peripheral Component Interconnect Express (PCIe)-compliant switching logic and an interface to interface the switching logic to the control host.

In one example, the enhanced routing capabilities include a simple assignment capability to dynamically assign one or more of the devices to respective hosts of the switch, a virtual assignment capability to define virtual partitions of resources provided by the devices and assign each partition to a respective one of the hosts, and a virtual device capability to instantiate one or more virtual devices to be hosted on the switch, where the virtual devices utilize resources of one or more of the devices and each virtual device is assigned to a respective one of the hosts.

In one example, the routing by the switch is according to a combination of two or more of the enhanced routing capabilities.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a switch comprising:
      one or more upstream ports to connect to respective hosts;
      one or more downstream ports to connect to respective devices;
      switching logic to facilitate a Peripheral Component Interconnect Express (PCIe)-based interconnect between the upstream and downstream ports;
      a control host embedded in the switch to provide one or more enhanced routing capabilities, wherein the control host comprises:
         a processor device;
         memory; and
         software executable by the processor device to process traffic received at one or more ports of the switch to redirect at least a portion of the traffic to provide the one or more enhanced routing capabilities,
      wherein the enhanced routing capabilities comprise:
         a simple assignment capability to assign one or more devices at downstream ports to a particular host at an upstream port such that devices other than the one or more devices are invisible to the particular host; and a virtual assignment capability to define virtual partitions of resources provided by a device at a downstream port and assign each virtual partition to a different host at an upstream port.

2. The apparatus of claim 1, wherein the processor device and memory are dedicated for the control host.

3. The apparatus of claim 1, wherein the simple assignment capability is further to assign a subset of the devices connected to downstream ports of the switch to a particular host.

4. The apparatus of claim 3, wherein the software is further executable to dynamically reassign at least a particular one of the devices outside the subset of devices to the particular host without changing the connection of the particular device to the switch.

5. The apparatus of claim 1, wherein the particular device does not natively support input/output virtualization (IOV).

6. The apparatus of claim 1, wherein the at least a portion of the set of hosts are directly connected to the switch using one or more upstream ports of the switch, one or more downstream ports of the switch are to interconnect to upstream ports of one or more other switches in a multi-tier architecture to provide multi-path redundancy between the particular device and the set of hosts, the particular device connects to a downstream port of particular one of the other switches, and each of the one or more other switches comprises a respective control host to support the virtual assignment capability.

7. The apparatus of claim 6, wherein the set of hosts comprises a plurality of hosts, at least one of the set of hosts is connected to an upstream port of another one of the other switches, the virtual partitions comprise a plurality of virtual partitions, a first one of the virtual partitions is assigned to a first one of the set of hosts, and a second one of the virtual partitions is assigned to a second one of the set of hosts.

8. The apparatus of claim 1, wherein the enhanced routing capabilities comprise a virtual device capability, the software is executable to instantiate one or more virtual devices hosted on the switch, a downstream port of the switch connects to at least one particular device, an upstream port of the switch connects to at least one particular host, at least a particular one of the virtual devices is to utilize resources of the particular device, and at least a portion of resources of the particular virtual device is assigned to the particular host.

9. The apparatus of claim 8, wherein the particular device is invisible to the particular host.

10. The apparatus of claim 8, wherein the particular virtual device is emulated as a device different from the particular device.

11. The apparatus of claim 1, wherein the enhanced routing capabilities comprise a host-to-host communication capability comprising provisioning one or more virtual devices on the switch, assigning access to two or more hosts to a particular virtual device, and the particular virtual device facilitates communication between the two or more hosts.

12. The apparatus of claim 11, wherein the particular virtual device comprises a virtual network interface controller (NIC).

13. The apparatus of claim 1, wherein the switch further comprises a control host interface between the control host and switching logic.

14. The apparatus of claim 1, wherein the switch further comprises a plurality of upstream ports and a plurality of downstream ports.

15. The apparatus of claim 14, wherein each of the ports comprises I/O logic for address translation.

16. The apparatus of claim 1, wherein an existing PCIe address space is utilized when providing the enhanced routing capabilities.

17. The apparatus of claim 1, wherein the switch lacks control flow functionality.

18. The apparatus of claim 1, wherein the traffic comprises PCIe-compliant transaction layer packets (TLPs), and the TLPs are to be transmitted un-encapsulated and unsegmented.

19. The apparatus of claim 1, wherein the enhanced routing capabilities comprise:
a virtual device capability to instantiate one or more virtual devices to be hosted on the switch, wherein the virtual devices utilize resources of one or more devices at one or more downstream ports of the switch, and each virtual device is assigned to respective hosts connected to one or more upstream ports of the switch.

20. At least one storage device within machine readable code stored thereon, the code executable by a processor to:
receive, at a control host comprising a processor device, a transaction layer packet through an interface, wherein the control host is embedded in a Peripheral Component Interconnect Express (PCIe)-compliant switch, the interface facilitates communication between the control host and switching logic of the control host;
determine, from the transaction layer packet, a destination of the packet;
generate, using the control host, a virtual device to be hosted on the switch, wherein the virtual device consumes resources of one or more physical devices connected to one or more downstream ports of the switch and hides the one or more physical devices from a host connected to an upstream port of the switch, the virtual device being presented to the host by the control host as being connected below a PCIe switch hierarchy; and
direct the packet to the virtual device.

21. A system comprising:
a plurality of hosts, wherein each host comprises a respective processor device;
a plurality of devices; and
a switch comprising a control host, wherein the plurality of hosts are connected to respective upstream ports of the switch, the plurality of devices are connected to respective downstream ports of the switch, and the control host comprises:
a dedicated processor device;
memory; and
software executable by the processor device to process traffic received at one or more ports of the switch to redirect at least a portion of the traffic to provide one or more enhanced routing capabilities,
wherein the enhanced routing capabilities comprise:
a simple assignment capability to dynamically assign one or more of the devices to respective hosts of the switch; and
a virtual assignment capability to define virtual partitions of resources provided by the devices and assign each partition to a respective one of the hosts.

22. The system of claim 21, wherein the switch further comprises Peripheral Component Interconnect Express (PCIe)-compliant switching logic and an interface to interface the switching logic to the control host.

23. The system of claim 21, wherein the enhanced routing capabilities comprise:

a virtual device capability to instantiate one or more virtual devices to be hosted on the switch, wherein the virtual devices utilize resources of one or more of the devices and each virtual device is assigned to a respective one of the hosts.

24. The system of claim 23, wherein the routing by the switch is according to a combination of two or more of the enhanced routing capabilities.

* * * * *